US007708950B2

(12) United States Patent
Yamada et al.

(10) Patent No.: US 7,708,950 B2
(45) Date of Patent: May 4, 2010

(54) MICROFLUIDIC DEVICE

(75) Inventors: Takayuki Yamada, Ebina (JP); Kazuaki Tabata, Ebina (JP); Mutsuya Takahashi, Ebina (JP); Yoshihisa Yamazaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1056 days.

(21) Appl. No.: 11/206,100

(22) Filed: Aug. 18, 2005

(65) Prior Publication Data

US 2006/0159601 A1 Jul. 20, 2006

(30) Foreign Application Priority Data

Dec. 28, 2004 (JP) .............................. 2004-382120

(51) Int. Cl.
*B01L 3/00* (2006.01)
*B01L 3/02* (2006.01)
*B01L 99/00* (2010.01)
*B01J 19/00* (2006.01)
*G01N 1/10* (2006.01)

(52) U.S. Cl. .................. 422/100; 422/99; 422/102; 422/103; 422/198; 436/180

(58) Field of Classification Search ................ 422/99, 422/100, 105, 198
See application file for complete search history.

(56) References Cited

U.S. PATENT DOCUMENTS

| 5,534,328 | A | * | 7/1996 | Ashmead et al. ............ 428/166 |
|---|---|---|---|---|
| 5,641,400 | A | * | 6/1997 | Kaltenbach et al. ...... 210/198.2 |
| 5,993,750 | A | * | 11/1999 | Ghosh et al. ................ 422/191 |
| 6,176,962 | B1 | | 1/2001 | Soane et al. |
| 6,537,506 | B1 | * | 3/2003 | Schwalbe et al. ........... 422/130 |
| 6,814,846 | B1 | | 11/2004 | Berndt |
| 6,821,449 | B2 | | 11/2004 | Caplen et al. |
| 6,821,898 | B2 | | 11/2004 | Beebe et al. |
| 7,118,917 | B2 | | 10/2006 | Bergh et al. |
| 2001/0029781 | A1 | | 10/2001 | Tai et al. |
| 2002/0094303 | A1 | | 7/2002 | Yamamoto et al. |
| 2002/0127149 | A1 | | 9/2002 | Dubrow et al. |
| 2005/0106078 | A1 | | 5/2005 | Kitamori et al. |
| 2005/0129580 | A1 | | 6/2005 | Swinehart et al. |

FOREIGN PATENT DOCUMENTS

| EP | 1 561 723 A1 | 8/2005 |
|---|---|---|
| JP | A 2002-058470 | 2/2002 |
| JP | A 2002-326963 | 11/2002 |
| WO | WO 99/19717 | 4/1999 |
| WO | WO 2004/046018 A1 | 6/2004 |

OTHER PUBLICATIONS

U.S. Appl. No. 11/206,111, Aug. 18, 2005, Tabata et al.
Itoh et al., "Room Temperature Vacuum Sealing Using Surface Activated Bonding Method", The 12th International Conference on Solid State Sensors, Actuators and Microsystems, Boston, pp. 1828-1831, Jun. 8-12, 2003.

* cited by examiner

*Primary Examiner*—Sam P Siefke
*Assistant Examiner*—Dean Kwak
(74) *Attorney, Agent, or Firm*—Oliff & Berridge, PLC

(57) ABSTRACT

A microfluidic device includes a processing layer and a temperature control layer. The processing layer applies a predetermined process to a subject fluid. The temperature control layer is disposed adjacent to the processing layer to give a predetermined temperature environment to the processing layer.

14 Claims, 17 Drawing Sheets

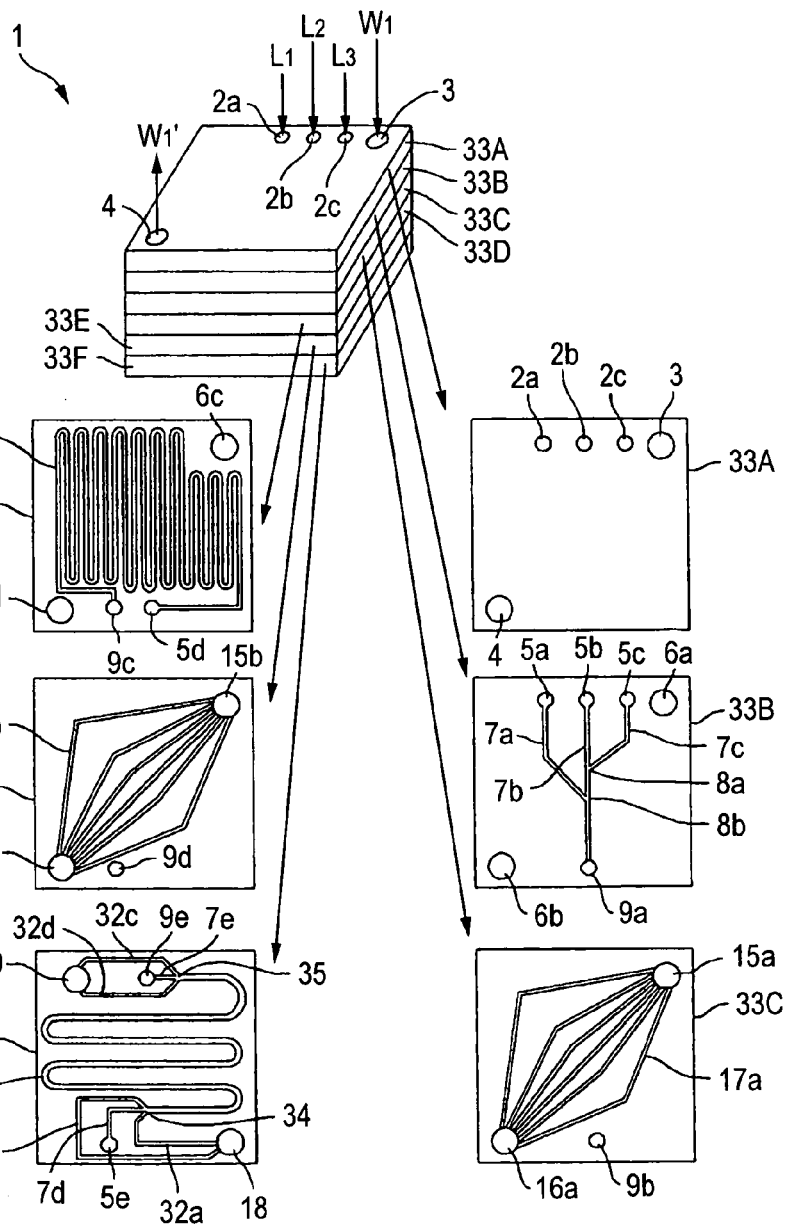

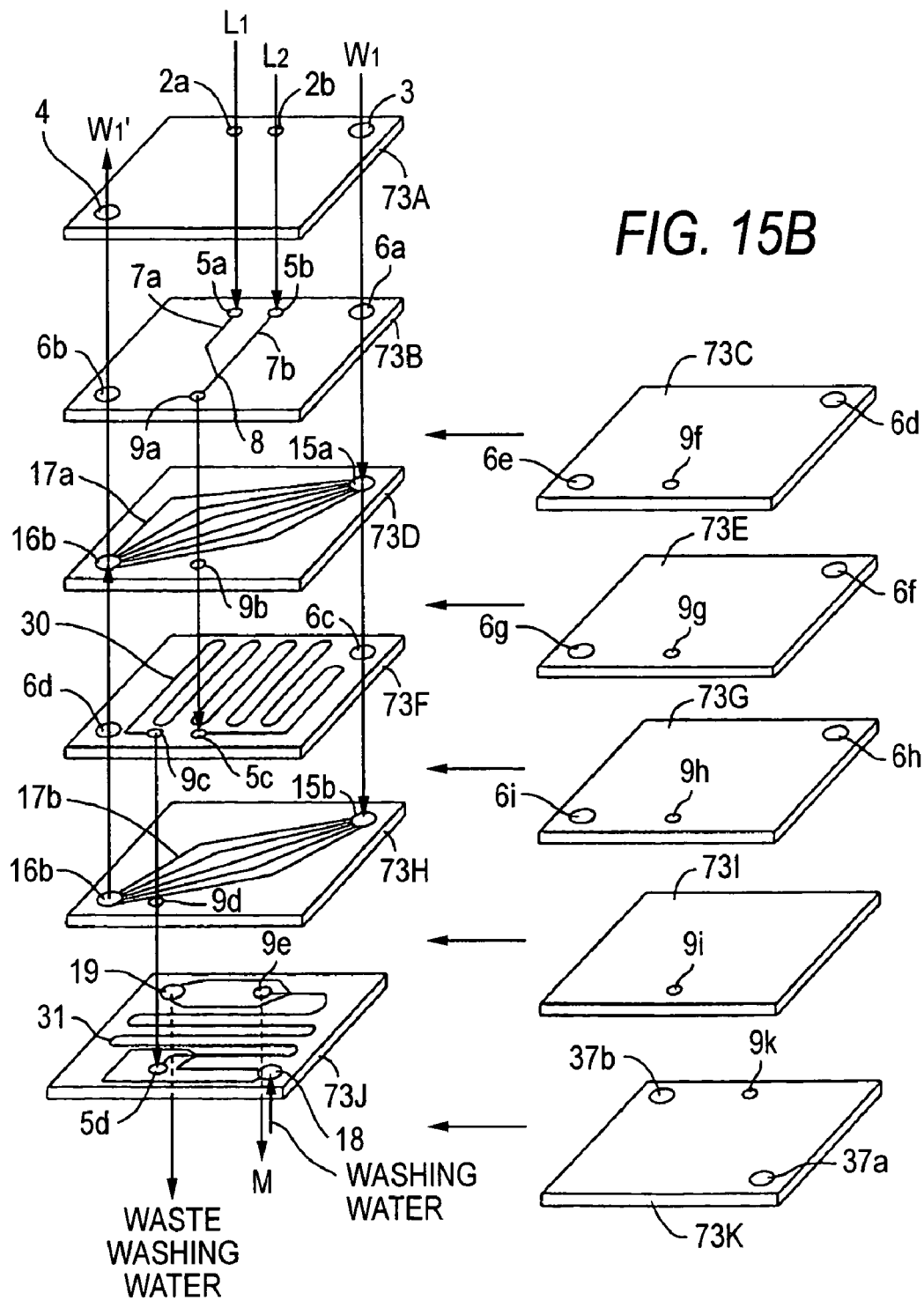

MICROFLUIDIC DEVICE

BACKGROUND OF THE INVENTION

1. Field of the Invention

The present invention relates to a microfluidic device produced by a layer manufacturing technology and particularly relates to a microfluidic device, which can be produced easily and can give an optimum processing environment to a process such as reaction of subject fluid.

2. Description of the Related Art

In the field of parts manufacture, a layer manufacturing technology has been recently spread rapidly as a method for forming a computer-designed complex three-dimensional object in a short time. In most cases, the layer manufacturing technology has been applied to relatively large parts with a size not smaller than the order of cm. In recent years, this method has been also applied to microstructures formed by high-precision processing, such as micro-gears, micro-optical parts, microfluidic devices, etc.

Microfluidic device is a generic terms of "microreactor", "lab-on a chip" or "micro total analytical systems (μ-TAS)". A microfluidic device can be integrated with another microfluidic device having another function such as synthesis, physicochemical treatment, detection to construct a microchemical system. Because the microfluidic devices are excellent in uniformity of reaction solution temperature and good in temperature response, it is possible to shorten reaction time and save the amount of a sample and the amount of a solvent used. Accordingly, because resources and energy required for production of a device can be saved, the microfluidic devices have merits in energy conservation in operation, reduction in the amount of waste, etc. There is expectation that the microfluidic devices will contribute to many industries in the future.

A microreactor provided as a kind of microfluidic device is a device having a micro reaction field smaller by several orders than that of an conventional reactor. In most cases, the microreactor uses a channel having a diameter of from 1 mm to the order of micros as the reaction field. Accordingly, the microreactor is also referred to as "micro channel reactor". It is conceived that temperature control can be performed accurately on the basis of reduction in heat capacity because the device surface area per unit volume of such a microreactor is large. Researches into the microreactor have been advanced in various countries because the microreactor is a device particularly having an appeal for catalytic reaction sensitive to temperature and having a reaction rate dependent on the contact area (e.g. see US2005/106078 A).

FIG. 17 shows a microreactor described in US 2005/106078A. This microreactor 100 is a microstructure provided as a laminate of a first pattern layer 110 serving as a top surface, a plurality of second pattern layers 120 each having a reaction portion 123 in which two source fluids $L_1$ and $L_2$ meet (merge into) and react with each other, and a third pattern layer 130 serving as a bottom portion.

The first pattern layer 110 has: first and second inlets 111a and 111b for inletting the two source fluids $L_1$ and $L_2$ in respectively; and an outlet 120 from which a reaction liquid M obtained as a product of reaction of the source fluids $L_1$ and $L_2$ is drained.

Each of the second pattern layers 120 defines: through-holes 121a, 121b and 121d defined so as to correspond to the inlets 111a and 111b and the outlet 112; a junction 122 in which the two source fluids $L_1$ and $L_2$ led in meet with (merge into) each other; and a reaction portion 123 in which the two source fluids $L_1$ and $L_2$ react with each other.

The microreactor 100 is produced in such a manner that the first to third pattern layers 110 to 130 formed from a glass substrate are pressurized and laminated by thermal fusion. When a plurality of pattern layers each having the same structure as the second pattern layer 120 are laminated, a plurality of reactions can be performed by parallel processing.

SUMMARY OF THE INVENTION

In the microreactor 100 according to US 2005/106078 A, the source fluids $L_1$ and $L_2$ are merged to flow together and react each other in the second pattern layer 120, which is a micro pattern layer. Therefore, in most cases, the reaction environment represented by the temperature condition can be hardly kept optimal.

The invention provides a microfluidic device, which can be produced easily and can give an optimum processing environment to a process such as reaction of subject fluid.

According to one embodiment of the invention, a microfluidic device includes a processing layer and a temperature control layer. The processing layer applies a predetermined process to a subject fluid. The temperature control layer is disposed adjacent to the processing layer to give a predetermined temperature environment to the processing layer.

According to this structure, an optimum process can be applied to subject fluid because the temperature control layer gives a predetermined temperature environment to the processing layer.

The processing layer may perform as the predetermined process one process selected from making the subject fluid a laminar flow, dividing flow of the subject fluid, merging the subject fluid and another fluid flow together, mixing the subject fluid and another fluid, making the subject fluid react, synthesizing another material from the subject fluid, diluting the subject fluid, washing the subject fluid and concentrating the subject fluid. The term "predetermined temperature environment" means a temperature environment for optimizing a process such as merging the subject fluid and another fluid to flow together and making the subject fluid react, and includes processing temperature such as reaction temperature, junction temperature, etc.

Here, the expression "merging fluid A and fluid B to flow together" means making the fluid A and the fluid B flow laminarly. Also, the expression "mixing fluid A and fluid B" means mixing the fluid A and the fluid B completely.

The processing layer and the temperature control layer may be laminated by room-temperature bonding. The term "room-temperature bonding" means direct bonding of atoms at room temperature. According to the room-temperature bonding, variations in shape and thickness of the constituent layers are so little that a high-precision microfluidic device can be obtained. A metal such as Al, Ni or Cu or a non-metal such as ceramics or silicon can be used as the material of the constituent layers. Before bonding of the constituent layers, the surfaces of the constituent layers may be irradiated with natural atom beams, ion beams or the like so that the surfaces of the constituent layers are washed. The surfaces are activated by washing, so that firm bonding can be obtained.

Each of the processing layer and the temperature control layer may be formed by electroforming or a semiconductor patterning process. In the case of electroforming, a metal substrate is used as the substrate. In the case where a semiconductor patterning process, such as photolithography and etching process for making fine patterns for the integrated semiconductor devices, is used, an Si wafer, a glass substrate, a quartz substrate or the like is used as the substrate.

According to one embodiment of the invention, a microfluidic device includes a first processing layer, a second processing layer, and a pair of temperature control layers. The first processing layer makes a plurality of subject fluids react with each other. In the second processing layer, a reaction fluid obtained as a product of reaction of the subject fluids is washed. One of the temperature control layers is disposed on one side of the first processing layer opposite to the second processing layer. The other of the temperature control layers is disposed between the first and second processing layers. The temperature control layers give a predetermined temperature environment to the first processing layer.

According to this structure, an optimum process can be applied to a plurality of subject fluids because the pair of temperature control layers gives a predetermined temperature environment to the first processing layer.

According to one embodiment of the invention, a microfluidic device includes a first processing layer, a second processing layer, a third processing layer, a pair of first temperature control layers, a pair of second temperature control layers, and a heat-insulating layer. The first processing layer makes a plurality of subject fluids to perform a first reaction in a first temperature region to produce a reaction fluid. The second processing layer makes a reaction fluid obtained as a product of the first reaction or the reaction fluid and another subject fluid to perform a second reaction in a second temperature region. In the third processing layer, a reaction fluid obtained as a product of the second reaction is washed. One of the first temperature control layers is disposed on a side of the first processing layer opposite to the second processing layer. The other of the first temperature control layers is disposed between the first and second processing layers. The first temperature control layers give a predetermined temperature environment to the first processing layer. One of the second temperature control layers is disposed on a side of the second processing layer opposite to the third processing layer. The other of the second temperature control layers is disposed between the second and third processing layers. The second temperature control layers give a predetermined temperature environment to the second processing layer. The heat-insulating layer is provided between the one of the first temperature control layers and the one of the second temperature control layers. The heat-insulating layer includes a closed space that shields heat conduction between the first and second processing layers.

According to this structure, an optimum process can be applied to a plurality of subject fluids even if the reaction temperature of the first processing layer is different from the reaction temperature of the second processing layer because the pair of first temperature control layers give a predetermined temperature environment to the first processing layer, the pair of second temperature control layers give a predetermined temperature environment to the second processing layer and the heat-insulating layer thermally insulates the first and second processing layers from each other.

According to the invention, an optimum processing environment can be given to a process such as reaction of subject fluid.

BRIEF DESCRIPTION OF THE DRAWINGS

Embodiments of the invention will be described in detail based on the following figures, wherein:

FIG. 6A is a perspective view showing a microreactor according to a second embodiment of the invention; and FIG. 6B is a plan view of respective pattern layers in the microreactor;

FIGS. 15A and 15B are exploded perspective views of the microreactor according to the sixth embodiment of the invention, FIG. 15A showing pattern layers having respective functions, FIG. 15B showing pattern layers laminated between the pattern layers having the respective functions;

DETAILED DESCRIPTION OF THE EMBODIMENTS

First Embodiment

Figures 1A, 1B:
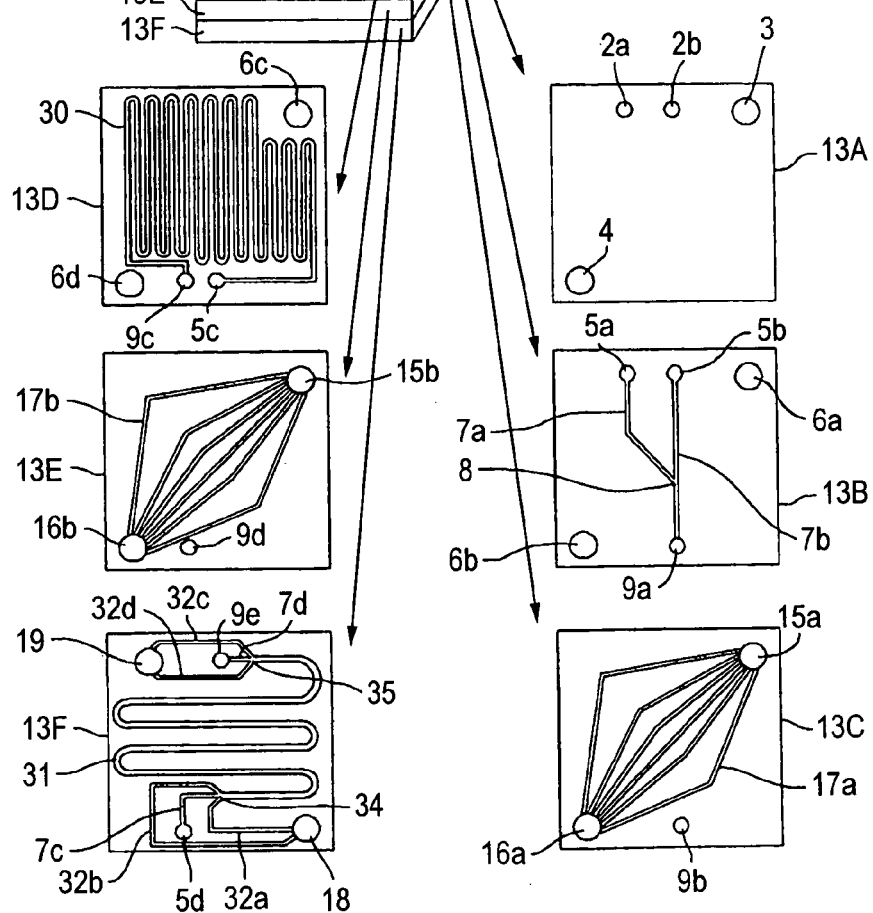
FIG. 1A is a perspective view showing a microreactor according to a first embodiment of the invention.
FIG. 1B is a plan view of respective pattern layers in the microreactor.

FIG. 1A is a perspective view showing a microreactor 1 according to a first embodiment of the invention. FIG. 1B is a plan view showing respective pattern layers in the microreactor. This microreactor 1 operates so that a reaction liquid as a product of reaction of two source fluids $L_1$ and $L_2$ under a predetermined temperature is washed and ejected. This microreactor 1 is provided as a laminate of six pattern layers 13A to 13F. The first pattern layer 13A leads the two source fluids $L_1$ and $L_2$ in. The second pattern layer 13B serves as a processing layer having a junction at which the source fluids $L_1$ and $L_2$ meet with (merge into) each other. The fourth pattern layer 13D serves as a processing layer having a reaction portion in which the source fluids $L_1$ and $L_2$ react with each other to produce a reaction liquid M. The third and fifth pattern layers 13C and 13E serve as temperature control layers in which constant-temperature water $W_1$, which serves as a heat exchange medium controlled to be kept at a predetermined temperature, flows to keep the temperature of the reaction portion of the fourth pattern layer 13D constant. The sixth pattern layer 13F has a washing portion for washing the reaction liquid M.

The first pattern layer 13A defines: first and second inlets 2a and 2b for leading the two source fluids $L_1$ and $L_2$ in, respectively; a constant-temperature water inlet 3 for leading the constant-temperature water $W_1$ in; and a constant-temperature water outlet 4 for ejecting used constant-temperature water $W_1'$.

The second pattern layer 13B defines: inlet holes 5a and 5b and through-holes 6a and 6b defined so as to correspond to the inlets 2a and 2b, constant-temperature water inlet 3 and constant-temperature water outlet 4 of the first pattern layer 13A; channels 7a and 7b through which the source fluids $L_1$ and $L_2$ flow laminarly and meet with (merge into) each other at a junction 8; and a through-hole 9a through which the source fluids $L_1$ and $L_2$ merged at the junction 8 flow down to the third pattern layer 13C under the second pattern layer 13B.

The third pattern layer 13C defines: a constant-temperature water inlet hole 15a, a constant-water ejection hole 16a and a through-hole 9b defined so as to correspond to the through-holes 6a, 6b and 9a of the second pattern layer 13B, respectively; and a plurality of groove portions 17a for connecting the constant-temperature water inlet hole 15a and the constant-water ejection hole 16a to each other.

The fourth pattern layer 13D defines: through-holes 6c and 6d and a inlet hole 5c defined so as to correspond to the constant-temperature water inlet hole 15a, constant-water ejection hole 16a and through-hole 9b of the third pattern layer 13C, respectively; a reaction portion 30 in which the source fluids $L_1$ and $L_2$ led in through the inlet hole 5c react with each other; and a through-hole 9c through which the reaction liquid M as a product of reaction of the source fluids $L_1$ and $L_2$ flows down to the fifth pattern layer 13E under the fourth pattern layer 13D.

The fifth pattern layer 13E defines: a constant-temperature water inlet hole 15b, a constant-temperature water ejection hole 16b and a through-hole 9d defined so as to correspond to the through-holes 6c, 6d and 9c of the fourth pattern layer 13D, respectively; and a plurality of groove portions 17b for connecting the constant-temperature water inlet hole 15b and the constant-temperature water ejection hole 16b to each other.

The sixth pattern layer 13F defines: a reaction liquid M inlet hole 5d defined so as to correspond to the through-hole 9d of the fifth pattern layer 13E; a washing water inlet 18 provided as a through-hole for leading washing water such as distilled water in upward; washing water channels 32a and 32b for flowing the washing water from the washing water inlet 18 to a junction 34; a channel 7c for flowing the reaction liquid M from the inlet hole 5d to a washing channel 31; the washing channel 31 for leading the washing water from the junction 34 and flowing the washing water as a laminar flow while bringing the washing water into contact with the reaction liquid M from the inlet hole 5d; a through-hole 9e from which the washed reaction liquid M separated at a flow-dividing portion 35 is ejected to the outside of the microreactor 1 through a channel 7d; and a washing water outlet 19 from which waste water after washing is ejected to the outside of the microreactor 1 through washing water channels 32c and 32d.

(Production Method According to the First Embodiment)

Figures 2A, 2B:
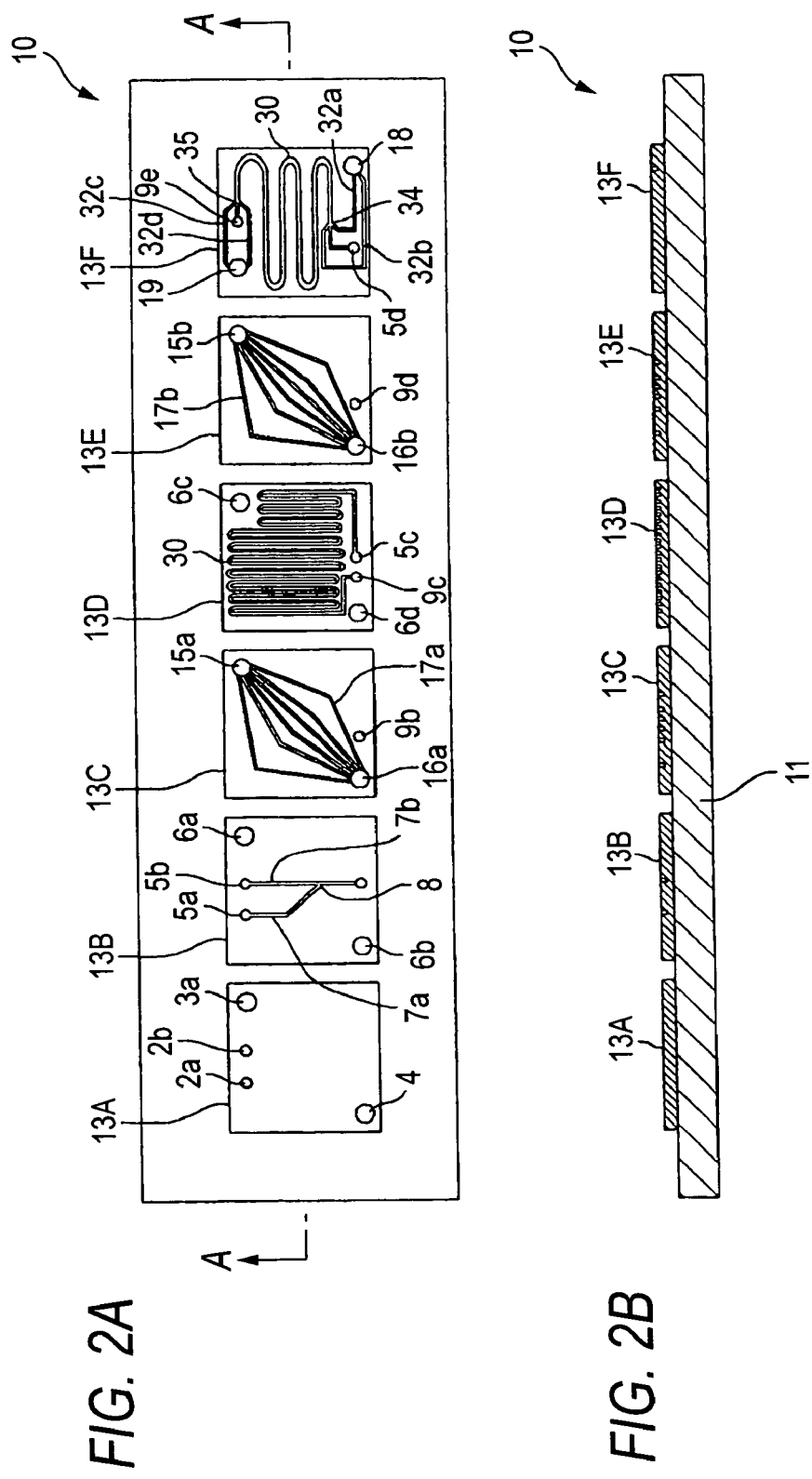
FIG. 2A is a plan view showing a donor substrate having pattern layers for forming the microreactor depicted in FIGS. 1A and 1B.
FIG. 2B is a sectional view taken along the line A-A in FIG. 2A.
Figure 3A:
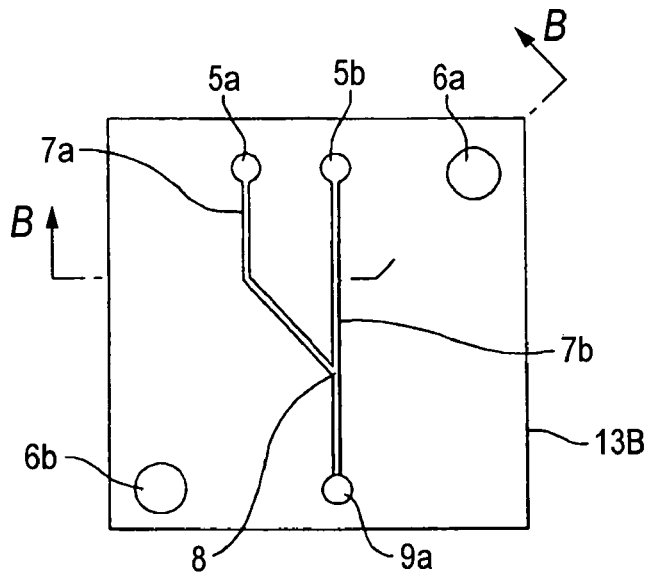
FIG. 3A is a plan view showing a pattern layer on the donor substrate.
Figure 3B:
FIG. 3B is a sectional view taken along the line B-B in FIG. 3A.

Next, a method for producing the microreactor 1 according to the first embodiment will be described with reference to FIGS. 2A and 2B, FIGS. 3A to 3F and FIGS. 4A to 4C. FIG. 2A is a plan view showing a donor substrate having pattern layers making up the microreactor depicted in FIGS. 1A and 1B. FIG. 2B is a sectional view taken along the line A-A in FIG. 2A. FIGS. 3A to 3F show a pattern layer on the donor substrate. FIG. 3A is a plan view of the pattern layer. FIG. 3B is a sectional view taken along the line B-B in FIG. 3A. FIGS. 3C to 3F are sectional views showing a process for producing the pattern layer by a two-stage electroforming method. FIGS. 4A to 4C are typical views showing a transfer process using a bonding apparatus. FIG. 4A is a view showing an FAB (Fast Atom Beam) processing step. FIG. 4B is a view showing the step of bonding the pattern layers. FIG. 4C is a view showing the step of removing the pattern layers.

(Producing of Donor Substrate)

The donor substrate 10 shown in FIGS. 2A and 2B is prepared. A method for producing the donor substrate by a two-stage electroforming method will be described herewith reference to FIGS. 3A to 3F. First, a substrate 11 of a metal is prepared. A first photo resist is applied on the substrate 11 and exposed to light while a first photomask corresponding to the respective pattern layers of the microreactor 1 to be produced is used. Then, the photo resist is developed to form a first resist pattern 38, which is reversal of each sectional pattern.

Figure 3C:
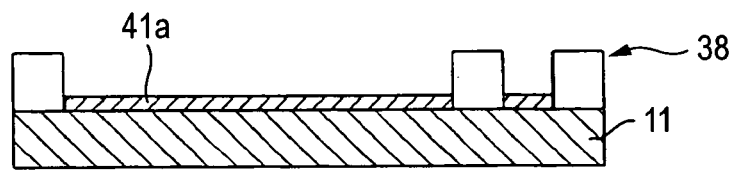
FIGS. 3C to 3F are sectional views showing a process of producing the pattern layer by a two-stage electroforming method.
Figure 3D:
Figure 4A:
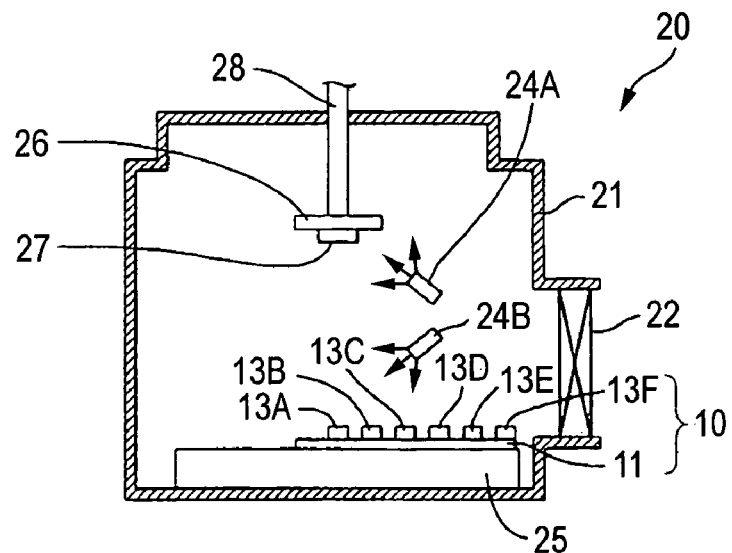
FIGS. 4A to 4C are typical views showing a transfer process using a bonding apparatus, FIG. 4A being a view showing an FAB processing step, FIG. 4B being a view showing the step of bonding pattern layers, FIG. 4C being a view showing the step of removing the pattern layers.
Figure 4B:
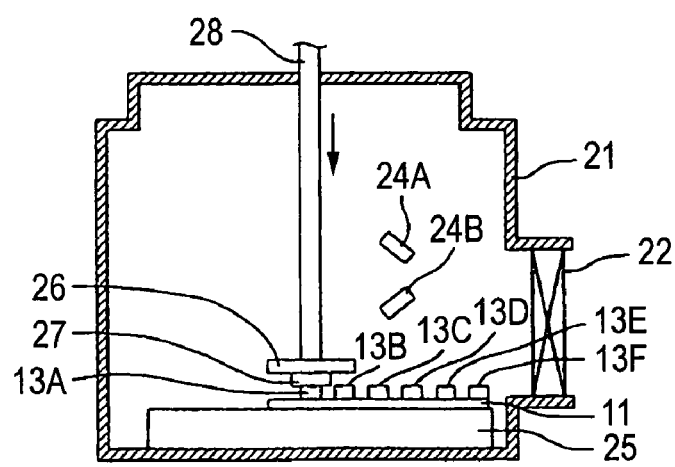
Figure 4C:
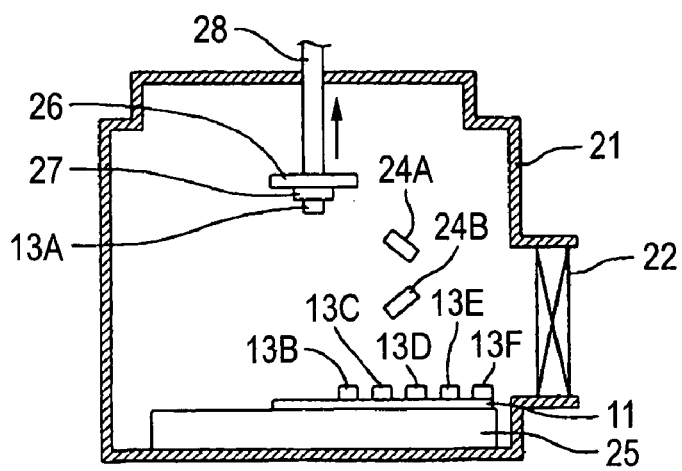

Then, as shown in FIG. 3C, electroforming is applied to the substrate 11 having the resist pattern 38 formed thereon, so that a nickel plating layer 41a is grown on a surface of the substrate 11, which is not covered with the photo resist. Then, as shown in FIG. 3D, the first resist pattern 38 is removed.

Figure 3E:
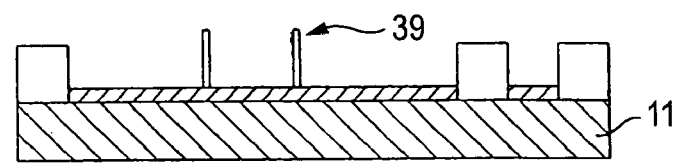
Figure 3F:
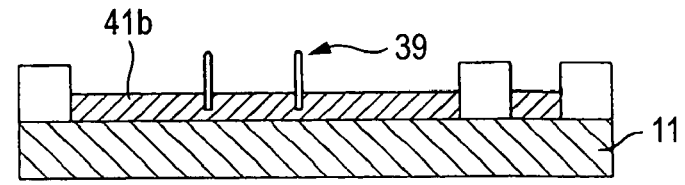

Then, a second photo resist is applied on the substrate 11 and exposed to light while a second photomask corresponding to the respective pattern layers of the microreactor 1 to be produced is used. Then, as shown in FIG. 3E, the photo resist is developed to form a second resist pattern 39, which is reversal of each sectional pattern. Then, as shown in FIG. 3F, electroforming is applied to the substrate 11 having the resist pattern 39 formed thereon, so that a nickel plating layer 41b is further formed on a surface of the nickel plating layer 41a in a portion of the substrate 11, which is not covered with the photo resist. Then, the second resist pattern 39 is removed. Thus, the pattern layer 13B shown in FIG. 3B is obtained.

(Transfer Process)

Then, a transfer process based on room-temperature bonding is carried out. First, as shown in FIG. 4A, the donor substrate 10 is fixed to a planar stage 25 in a vacuum chamber 21 while a target substrate 27 is fixed to a counter stage 26. The vacuum chamber 21 is evacuated through an air outlet 22 to form a vacuum of $10^{-6}$ Pa. Then, FABs (Fast Atom Bombardments) made of Ar neutral beams emitted from FAB sources 24A and 24B are applied on the target substrate 27 and the pattern layer 13A of the donor substrate 10, respectively to clean their surfaces to thereby activate their surfaces.

Then, as shown in FIG. 4B, while a vertical stage 28 is moved down, the planar stage 25 is moved in x and y directions horizontally and in a θ direction around a z axis vertically to thereby align the first pattern layer 13A with the target substrate 27. Then, the target substrate 27 and the first pattern layer 13A are brought into contact with each other and pressed against each other under a load of 50 kgf/cm² for 5 minutes, so that the target substrate 27 and the first pattern layer 13A are bonded to each other. The bonding strength on this occasion is from 50 to 100 MPa.

When the vertical stage 28 is then moved up as shown in FIG. 4C, the first pattern layer 13A is transferred onto the target substrate 27. The reason why the pattern layer 13A can be transferred from the donor substrate 10 side onto the target substrate 27 side is that adhesive force between the pattern layer 13A and the target substrate 27 is larger than that between the pattern layer 13A and the substrate 11. Then, the planar stage 25 is moved in order to apply FABs on the first and second pattern layers 13A and 13B. FABs are applied on a rear surface (which was in contact with the substrate 11) of the first pattern layer 13A and applied on a front surface of the second pattern layer 13B. After the first pattern layer 13A and the second pattern layer 13B are aligned with each other, the first pattern layer 13A and the second pattern layer 13B are bonded to each other in the aforementioned manner. The same operation as described above is carried out for the third to sixth pattern layers 13C to 13F. When transferring is performed six times, the microreactor 1 shown in FIGS. 1A and 1B is obtained.

(Operation of the First Embodiment)

Figure 5A:
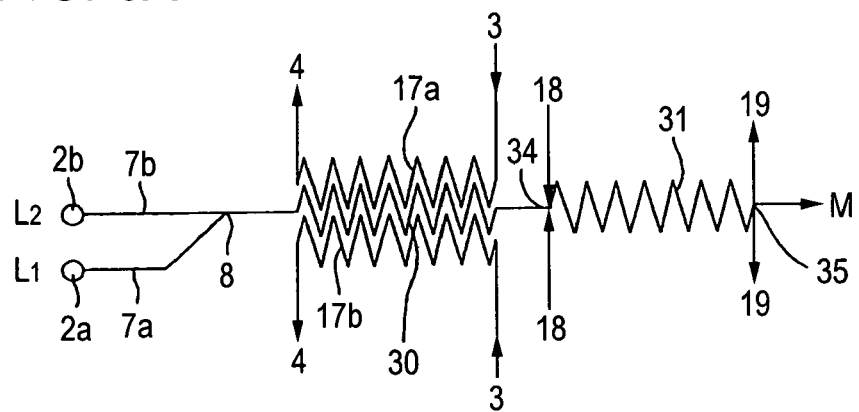
FIG. 5A is a fluid circuit diagram showing the operation of the microreactor according to the first embodiment of the invention.
Figure 5B:
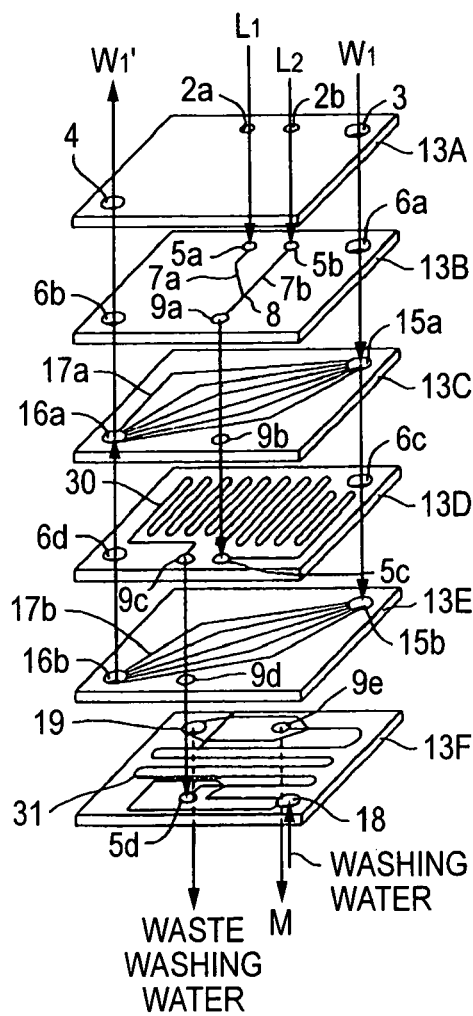
FIG. 5B is a perspective view showing a flow of fluid in the microreactor.

Next, the operation of the microreactor 1 according to the first embodiment will be described with reference to FIGS. 5A and 5B. FIG. 5A is a fluid circuit diagram showing the operation of the microreactor 1. FIG. 5B is a perspective view showing a flow of fluid in the microreactor 1.

(Merging and Reaction of First and Second Source fluids)

When the first source fluid $L_1$ is led through the first inlet 2a of the first pattern layer 13A while the second source fluid $L_2$ is led through the second inlet 2b of the first pattern layer 13A, the two source fluids $L_1$ and $L_2$ flow laminarly in the channels 7a and 7b through the inlet holes 5a and 5b of the second pattern layer 13B and meet with (merge into) each other at the junction 8. The merged source fluids $L_1$ and $L_2$ are led into the inlet hole 5c of the fourth pattern layer 13D through the through-hole 9a of the second pattern layer 13B and the through-hole 9b of the third pattern layer 13C. The source fluids $L_1$ and $L_2$ led into the inlet hole 5c flow laminarly in the reaction portion 30 and advance while reacting with each other in liquid interfaces between the source fluids $L_1$ and $L_2$. The reaction liquid M as a product of reaction is ejected from the through-hole 9c and led into the inlet hole 5d of the sixth pattern layer 13F through the through-hole 9d of the fifth pattern layer 13E.

(Washing of Reaction Liquid)

The reaction liquid M led into the inlet hole 5d flows in the washing channel 31 through the channel 7c. On the other hand, the washing water led in through the washing water inlet 18 is led into the washing channel 31 through the washing water channels 32a and 32b from both sides of the reaction liquid M at the junction 34. The reaction liquid M comes into contact with the washing water and flows laminarly in the form of a three-layer structure in which the reaction liquid M is sandwiched between two layers of washing water. Unnecessary solvent components of the reaction liquid M diffuse into the washing water. The washed reaction liquid M flows only in the center portion of the washing channel 31. Accordingly, at the flow-dividing portion 35, the reaction liquid M flowing in the center portion is separated from the washing water flowing in the left and right of the reaction liquid M. The separated reaction liquid M is ejected from the through-hole 9e to the outside of the microreactor 1 through the channel 7d. Waste water after washing is ejected from the washing water outlet 19 to the outside of the microreactor 1 through the washing water channels 32c and 32d.

(Temperature Control of Reaction Portion)

On the other hand, the constant-temperature water $W_1$ led through the constant-temperature water inlet 3 of the first pattern layer 13A reaches the constant-temperature water inlet hole 15a of the third pattern layer 13C through the through-hole 6a of the second pattern layer 13B. The constant-temperature water $W_1$ flows in the groove portions 17a from the constant-temperature water inlet hole 15a and is drained upward from the constant-temperature water ejection hole 16a. On the other hand, the constant-temperature water $W_1$, which has reached the constant-temperature water inlet hole 15b of the fifth pattern layer 13E through the through-hole 6c of the fourth pattern layer 13D from the constant-temperature inlet hole 15a, flows in the groove portions 17b and is drained upward from the constant-temperature water ejection hole 16b. The constant-temperature water $W_1'$ drained from the constant-temperature water ejection hole 16b reaches the constant-temperature water ejection hole 16a through the through-hole 6d of the fourth pattern layer 13D and meets with (merges into) the constant-temperature water $W_1'$ drained from the constant-temperature water ejection hole 16a, so that the confluent water $W_1'$ is drained from the constant-temperature water outlet 4 through the through-hole 6b of the second pattern layer 13B. On this occasion, the third and fifth pattern layers 13C and 13E are arranged so that the fourth pattern layer 13D is sandwiched between the third and fifth pattern layers 13C and 13E. Thus, the constant-temperature water $W_1$ at the temperature kept constant circulates to keep the reaction temperature at a desired temperature even if there is an exothermic or endothermic change caused by the reaction in the reaction portion 30. The reaction advances after the temperature of the source fluids $L_1$ and $L_2$ reaches a suitable temperature in the reaction portion 30.

(Effects of the First Embodiment)

According to the first embodiment as described above, the following effects can be obtained.

(i) Because the pattern layers 13C and 13E in which constant-temperature water flows sandwich therebetween the pattern layer 13D having the reaction portion 30, the temperature of the reaction portion 30 can be controlled efficiently.

(ii) Because one pattern layer has one function, it is possible to perform temperature control for each layer by sandwiching each layer having each function between the temperature-controllable pattern layers 13C and 13E.

(iii) Because unnecessary solvent components of the reaction liquid M diffuse into the washing water by washing, the purity of the reaction liquid M flowing in the center portion can be improved.

(iv) Because multiple stacking of channel plates (pattern layers) having different functions is possible, optimization of the reaction can be attained to improve the yield of the reaction liquid.

(v) Because each pattern layer is formed by a two-stage electroforming method, it is possible form a channel and a pattern layer having a portion serving as a bottom of the channel in one thin film. Accordingly, because no member (e.g., membrane) is required for covering the channel or the like, reduction in size of the microreactor 1 can be achieved by reduction in number of layers.

Second Embodiment

FIG. 6A is a perspective view showing a microreactor 1 according to a second embodiment of the invention. FIG. 6B is a plan view showing respective pattern layers in the microreactor 1. Numerals the same as in FIGS. 1A and 1B, FIGS. 2A and 2B, FIGS. 3A to 3F, FIGS. 4A to 4C and FIGS. 5A and 5B have functions the same as in these drawings. Accordingly, the description of these parts will be omitted.

This microreactor 1 is formed in the same manner as the microreactor 1 in the first embodiment except that the number of source fluids is changed from 2 to 3. Accordingly, a third inlet 2c for inletting a third source fluid $L_3$ in is additionally provided in the first pattern layer 33A and a third inlet hole 5c corresponding to the inlet 2c is additionally provided in the second pattern layer 33B. A channel 7c for the source fluid $L_3$ is defined so as to start at the inlet hole 5c. The channel 7c is defined so that the third source fluid $L_3$ meets with (merges into) the second source fluid $L_2$ at a junction 8a.

(Operation of the Second Embodiment)

Figure 7A:
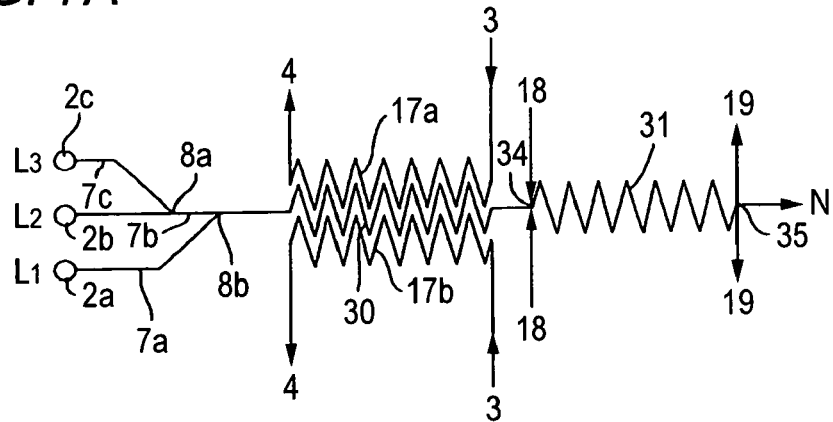
FIG. 7A is a fluid circuit diagram showing the operation of the microreactor according to the second embodiment of the invention.
Figure 7B:
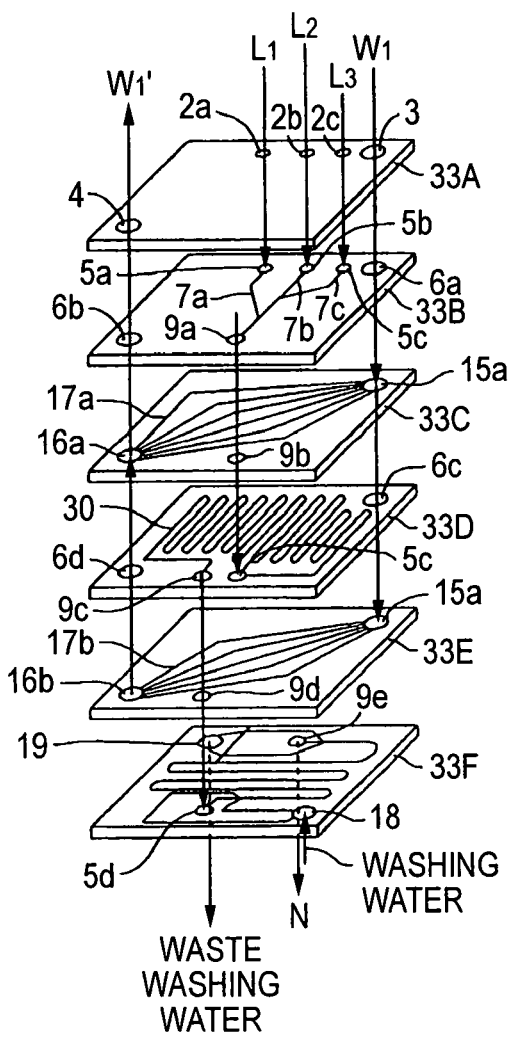
FIG. 7B is a perspective view showing a flow of fluid in the microreactor.

Next, the operation of the microreactor 1 according to the second embodiment will be described with reference to FIGS. 7A and 7B. FIG. 7A is a fluid circuit diagram showing the operation of the microreactor 1. FIG. 7B is a perspective view showing a flow of fluid in the microreactor 1.

(Merging and Reaction of the First to Third Source fluids)

When the first source fluid $L_1$ is led in through the first inlet 2a of the first pattern layer 33A, the second source fluid $L_2$ is led in through the second inlet 2b of the first pattern layer 33A and the third source fluid $L_3$ is led in through the third inlet 2c of the first pattern layer 33A, these source fluids $L_1$, $L_2$ and $L_3$ flow laminarly in the channels 7a, 7b and 7c through the inlet holes 5a, 5b and 5c of the second pattern layer 33B and meet with (merge into) one another at the junctions 8a and 8b. The source fluids $L_1$, $L_2$ and $L_3$ are drained from the through-hole 9a and led into the inlet hole 5d of the fourth pattern layer 33D through the through-hole 9b of the third pattern layer 33C. The source fluids $L_1$, $L_2$ and $L_3$ led into the inlet hole 5d flow laminarly in the reaction portion 30 and advance while reacting with one another at liquid interfaces between the first and second source fluids $L_1$ and $L_2$ and between the second and third source fluids $L_2$ and $L_3$. The reaction liquid N obtained as a product of reaction of the source fluids $L_1$ to $L_3$ is drained from the through-hole 9c and led into the inlet hole 5e of the sixth pattern layer 33F through the through-hole 9d of the fifth pattern layer 33E.

(Washing of the Reaction Liquid)

The reaction liquid N led into the inlet hole 5e is washed with washing water led in through the washing water inlet 18 of the sixth pattern layer 33F in the same manner as in the first embodiment. The washed reaction liquid N is drained from the through-hole 9e to the outside of the microreactor 1. On the other hand, waste water after washing is drained from the washing water outlet 19 to the outside of the microreactor 1.

(Temperature Control of the Reaction Portion)

On the other hand, the constant-temperature water $W_1$ led in through the constant-temperature water inlet 3 of the first pattern layer 33A flows in the groove portions 17a and 17b of the third and fifth pattern layers 33C and 33E and is drained from the constant-temperature water outlet 4 of the first pattern layer 33A in the same manner as in the first embodiment. The reaction portion 30 of the fourth pattern layer 33D sandwiched between the third and fifth pattern layers 33C and 33E is kept at a desired reaction temperature even if there is an exothermic or endothermic change caused by the reaction.

(Effect of the Second Embodiment)

According to the microreactor 1 according to the second embodiment as described above, the temperature of the reaction portion 30 can be controlled to improve the yield of the product of reaction even if increasing amounts of source fluids react with each other because the pattern layer 33D having the reaction portion 30 is sandwiched between the third and fifth pattern layers 33C and 33E, which serve as heat exchange portions.

Third Embodiment

Figures 8A, 8B:
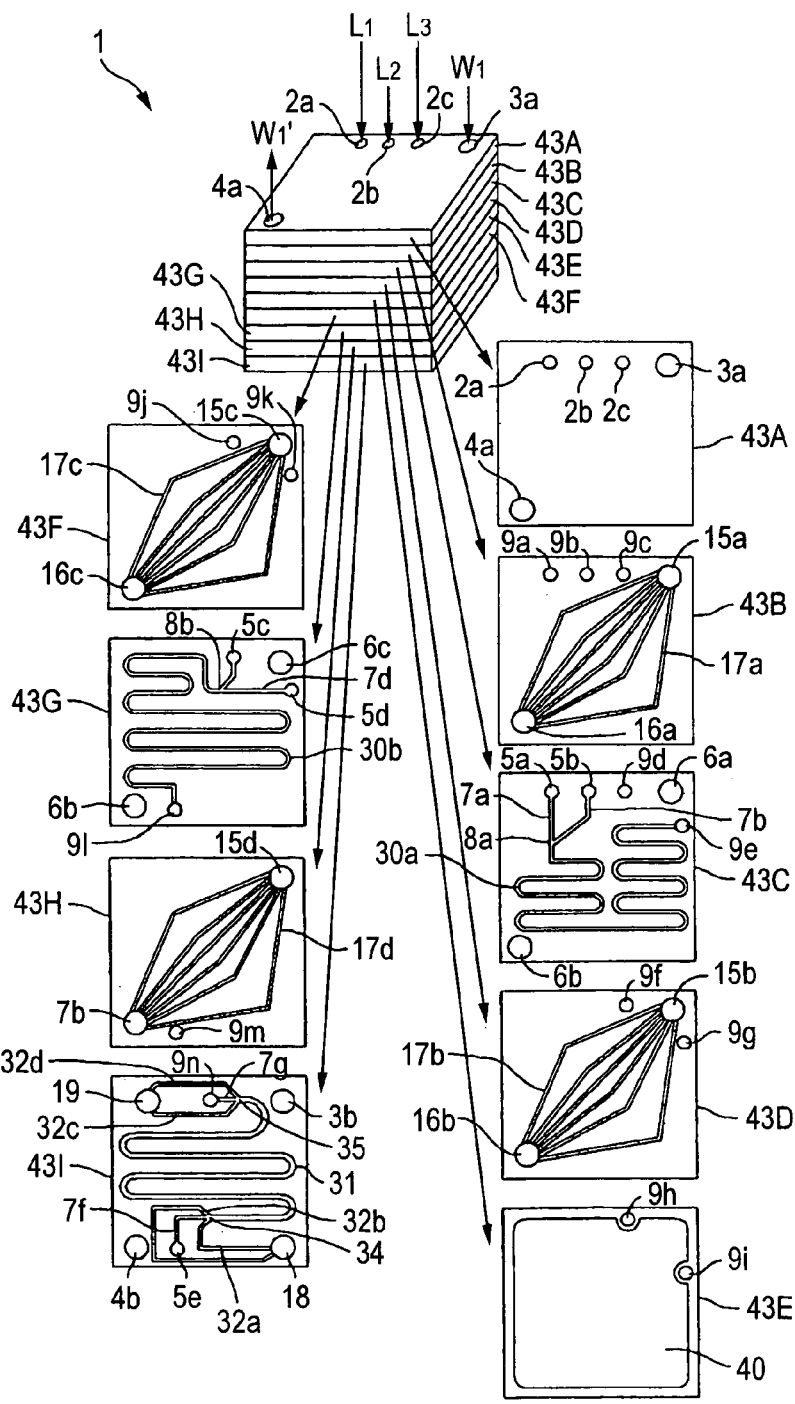
FIG. 8A is a perspective view showing a microreactor according to a third embodiment of the invention.
FIG. 8B is a plan view of respective pattern layers in the microreactor.

FIG. 8A is a perspective view showing a microreactor 1 according to a third embodiment of the invention. FIG. 8B is a plan view showing respective pattern layers in the microreactor 1. This microreactor 1 is composed of nine layers. Reactions different in reaction temperature are performed in two different pattern layers 43C and 43G. The pattern layer 43C provided for a reaction is sandwiched between pattern layers 43B and 43D, which serve as heat exchange portions. The pattern layer 43G provided for a reaction is sandwiched between pattern layers 43F and 43H, which serve as heat exchange portions. A pattern layer 43E, which serves as a heat-insulating layer, is provided between the pattern layers 43C and 43G provided for the reactions. A pattern layer 43I for washing the reaction liquid is provided as a lowermost layer. Incidentally, each of the pattern layers 43A to 43I is formed by a two-stage electroforming method.

The first pattern layer 43A defines: first to third inlets 2a, 2b and 2c for leading three source fluids $L_1$, $L_2$ and $L_3$ in; a constant-temperature water inlet 3a for leading constant-temperature water $W_1$ in; and a constant-temperature water outlet 4a for draining used constant-temperature water $W_1$'.

The second pattern layer 43B defines: through-holes 9a, 9b and 9c, a constant-temperature water inlet hole 15a and a constant-temperature water ejection hole 16a defined so as to correspond to the inlets 2a, 2b and 2c, the constant-temperature water inlet 3 and the constant-temperature water outlet 4 of the first pattern layer 43A; and a plurality of groove portions 17a for connecting the constant-temperature water inlet hole 15a and the constant-temperature water ejection hole 16a to each other.

The third pattern layer 43C defines: inlet holes 5a and 5b and through-holes 9d, 6a and 6b defined so as to correspond to the through-holes 9a, 9b and 9c, the constant-temperature water inlet hole 15a and the constant-temperature ejection hole 16a of the second pattern layer 43B; channels 7a and 7b in which the source fluids $L_1$ and $L_2$ flow laminarly and meet with (merge into) each other at a junction 8a; a first reaction portion 30a in which the source fluids $L_1$ and $L_2$ merged at the junction 8a react with each other in a laminar flow state; and a through-hole 9e through which the reaction liquid M obtained as a product of reaction of the source fluids $L_1$ and $L_2$ is led to the lower layer.

The fourth pattern layer 43D defines: through-holes 9f and 9g, a constant-temperature water inlet hole 15b and a constant-temperature water ejection hole 16b defined so as to correspond to the through-holes 9d, 9e, 6a and 6b of the third pattern layer 43C; and a plurality of groove portions 17b for connecting the constant-temperature water inlet hole 15b and the constant-temperature water ejection hole 16b to each other.

The fifth pattern layer 43E defines: through-holes 9h and 9i defined so as to correspond to the through-holes 9f and 9g of the fourth pattern layer 43D; and a recess 40 forming a closed space when the fourth pattern layer 43D is laminated on the fifth pattern layer 43E.

The sixth pattern layer 43F defines: through-holes 9j and 9k defined so as to correspond to the through-holes 9h and 9i of the fifth pattern layer 43E; a constant-temperature water inlet hole 15c into which constant-temperature water is led from the lowermost layer; a constant-temperature water ejection hole 16c for draining the constant-temperature water; and a plurality of groove portions 17c for flowing the constant-temperature water horizontally.

The seventh pattern layer 43G defines: inlet holes 5c and 5d and through-holes 6c and 6d defined so as to correspond to the through-holes 9j and 9k, the constant-temperature water inlet hole 15c and the constant-temperature water ejection hole 16c of the sixth pattern layer 43F; channels 7c and 7d in which the reaction liquid M led in and the third source fluid $L_3$ flow laminarly and meet with (merge into) each other at a junction 8b; a second reaction portion 30b in which the reaction liquid M and the third source fluid $L_3$ merged at the junction 8b react with each other in a laminar flow state; and a through-hole 9l through which the reaction liquid P obtained as a product of reaction of the reaction liquid M and the third source fluid $L_3$ is led to the lower layer.

The eighth pattern layer 43H defines: a through-hole 9m, a constant-temperature water inlet hole 15d and a constant-temperature water ejection hole 16d defined so as to correspond to the through-holes 9l, 6c and 6d of the seventh pattern layer 43G; and a plurality of groove portions 17d for flowing the constant-temperature water horizontally.

The ninth pattern layer 43I defines: a reaction liquid P inlet hole 5e defined so as to correspond to the through-hole 9m of the eighth pattern layer 43H; a washing water inlet 18 provided as a through-hole for leading washing water such as distilled water in; washing water channels 32a and 32b for flowing the washing water from the washing water inlet 18 to a junction 34; a channel 7f for flowing the reaction liquid P to a washing channel 3l; a washing channel 31 for leading the washing water in from the junction 34 and flowing the washing water as a laminar flow while bringing the washing water into contact with the reaction liquid P from the inlet hole 5e; a through-hole 9n for separating the washed reaction liquid P after washed at a flow-dividing portion 35 and draining the reaction liquid P to the outside of the microreactor 1 through a channel 7g; and a washing water outlet 19 from which waste water after washing is drained to the outside of the microreactor 1 through washing water channels 32c and 32d.

(Operation of the Third Embodiment)

Figure 9:
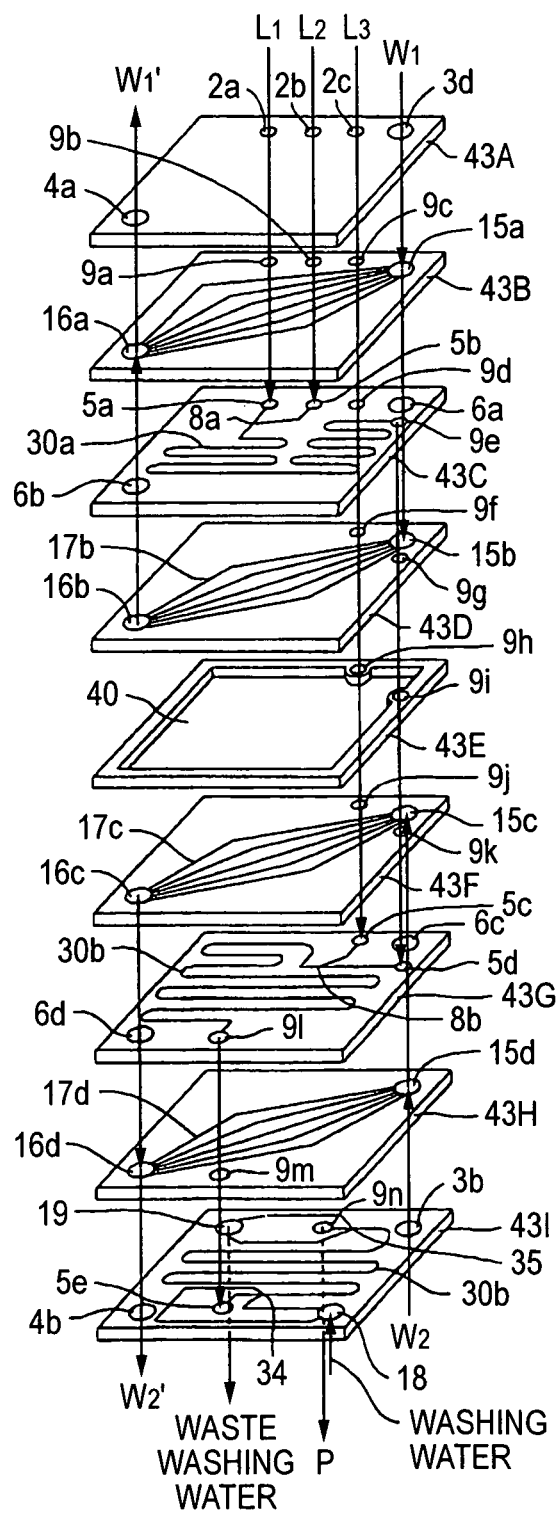
FIG. 9 is an exploded perspective view showing a flow of fluid in the microreactor according to the third embodiment of the invention.

Next, the operation of the microreactor 1 according to the third embodiment will be described with reference to FIG. 9. FIG. 9 is an exploded perspective view showing a flow of fluid in the microreactor 1.

(Merging and Reaction of the First and Second Source Fluids)

When the first source fluid $L_1$ is led in through the first inlet 2a of the first pattern layer 43A while the second source fluid $L_2$ is led in through the second inlet 2b of the first pattern layer 43A, these source fluids $L_1$ and $L_2$ are led into the inlet holes 5a and 5b of the third pattern layer 43C through the through-holes 9a and 9b of the second pattern layer 43B. The source fluids $L_1$ and $L_2$ led into the inlet holes 5a and 5b flow laminarly in the channels 7a and 7b and meet with (merge into) each other at the junction 8a. The merged source fluids $L_1$ and $L_2$ flow laminarly in the first reaction portion 30a and advance while reacting with each other at liquid interfaces between the source fluids $L_1$ and $L_2$. The reaction liquid M obtained as a product of reaction is drained from the through-hole 9e and led into the inlet hole 5d of the seventh pattern layer 43G via the through-hole 9g of the fourth pattern layer 43D, the through-hole 9i of the fifth pattern layer 43E and the through-hole 9k of the sixth pattern layer 43F.

(Merging and Reaction of the First Reaction Liquid and the Third Source Fluid)

On the other hand, the third source fluid $L_3$ led into the inlet 2c is led into the inlet hole 5c of the seventh pattern layer 43G via the through-hole 9c of the second pattern layer 43B, the through-hole 9d of the third pattern layer 43C, the through-hole 9f of the fourth pattern layer 43D, the through-hole 9h of the fifth pattern layer 43E and the through-hole 9j of the sixth pattern layer 43F. Then, the reaction liquid M led into the inlet hole 5c and the third source fluid $L_3$ led into the inlet hole 5d meet with (merge into) each other at the second junction 8b and flow laminarly in the second reaction portion 30b. In the second reaction portion 30b, the reaction liquid M and the third source fluid $L_3$ advance while reacting with each other at liquid interfaces between the reaction liquid M and the third source fluid $L_3$. The reaction liquid P obtained as a product of reaction is drained from the through-hole 9l and led into the inlet hole 5e of the ninth pattern layer 43I via the through-hole 9m of the eighth pattern layer 43H.

(Washing of the Last Reaction Liquid)

The reaction liquid P led into the inlet hole 5e flows in the washing channel 3l through the channel 7f. On the other hand, the washing water led in from the washing water inlet 18 is led into the washing channel 3l from both sides of the reaction liquid P at the junction 34 through the washing water channels 32a ad 32b. The reaction liquid P comes into contact with the washing water and flows as a laminar flow having a three-layer structure in which the reaction liquid P is sandwiched between two layers of the washing water. Unnecessary solvent components of the reaction liquid P diffuse into the washing water. At the flow-dividing portion 35, the reaction liquid P flowing in the center is separated from the washing water flowing in the left and right of the reaction liquid P because the washed reaction liquid P flows only in the center portion of the washing channel 31. The separated reaction liquid P is drained from the through-hole 9n to the outside of the microreactor 1 through the channel 7g. The washing water is drained from the washing water outlet 19 to the outside of the microreactor 1 through the washing water channels 32c and 32d.

(Temperature Control of the First Reaction Portion)

On the other hand, the constant-temperature water $W_1$ kept at a controlled temperature $T_1$ and led in from the constant-temperature water inlet 3a of the first pattern layer 43A reaches the constant-temperature water inlet hole 15a of the second pattern layer 43B. The constant-temperature water $W_1$ flows in the groove portions 17a and is drained upward from the constant-temperature water ejection hole 16a. On the other hand, the constant-temperature water $W_1$, which has reached the constant-temperature water inlet hole 15b of the fourth pattern layer 43D from the constant-temperature water inlet hole 15a via the through-hole 6a of the third pattern layer 43C, flows in the groove portions 17b and is drained upward from the constant-temperature water ejection hole 16b. The constant-temperature water $W_1'$ drained from the constant-temperature water ejection hole 16b reaches the constant-temperature water ejection hole 16a via the through-hole 6b of the third pattern layer 43C and meets with (merges into) the constant-temperature water $W_1'$ drained from the constant-temperature water ejection hole 16a. The merged constant-temperature water $W_1'$ is drained from the constant-temperature water outlet 4a of the first pattern layer 43A.

(Temperature Control of the Second Reaction Portion)

On the other hand, the constant-temperature water $W_2$ kept at a controlled temperature $T_2$ and led in from the constant-temperature water inlet 3b of the ninth pattern layer 43I reaches the constant-temperature water inlet hole 15d of the eighth pattern layer 43H. The constant-temperature water $W_2$ flows in the groove portions 17d and is drained downward from the constant-temperature water ejection hole 16d. On the other hand, the constant-temperature water $W_2$, which has reached the constant-temperature water inlet hole 15c of the sixth pattern layer 43F from the constant-temperature water inlet hole 15d via the through-hole 6c of the seventh pattern layer 43G, flows in the groove portions 17c and is drained downward from the constant-temperature water ejection hole 16c. The constant-temperature water $W_2'$ drained from the constant-temperature water ejection hole 16c reaches the constant-temperature water ejection hole 16d via the through-hole 6d of the seventh pattern layer 43G and meets with the constant-temperature water $W_2'$ drained from the constant-temperature water ejection hole 16d. The merged constant-temperature water $W_2'$ is drained from the constant-temperature water outlet 4b of the ninth pattern layer 43I.

(Heat Insulation Between the First and Second Reaction Portions)

Heat conduction between the first and second reaction portions 30a and 30b is shielded by the fifth pattern layer 43E having the recess 40, which is kept vacuum and is located between the third and seventh pattern layers 43C and 43G having the first and second reaction portions 30a and 30b.

(Effects of the Third Embodiment)

According to the third embodiment, the following effects can be obtained in addition to the effects of the microreactor 1 according to the second embodiment.

(i) Because configuration is made so that the pattern layer 43C having the first reaction portion 30a is sandwiched between the second and fourth pattern layers 43B and 43D serving as heat exchange portions while the pattern layer 43G having the second reaction portion 30b is sandwiched between the sixth and eighth pattern layers 43F and 43H serving as heat exchange portions, reaction can advance at an optimum temperature in each reaction portion to improve the yield of the product of reaction.

(ii) Because a heat-insulating layer is provided between the pattern layer 43C having the first reaction portion 30a and the pattern layer 43G having the second reaction portion 30b, heat transfer between the first and second reaction portions 30a and 30b can be reduced to make it easy to control the reaction temperatures of the first and second reaction portions 30a and 30b even if the difference between the reaction temperatures of the first and second reaction portions 30a and 30b is large.

Fourth Embodiment

Figures 10A, 10B:
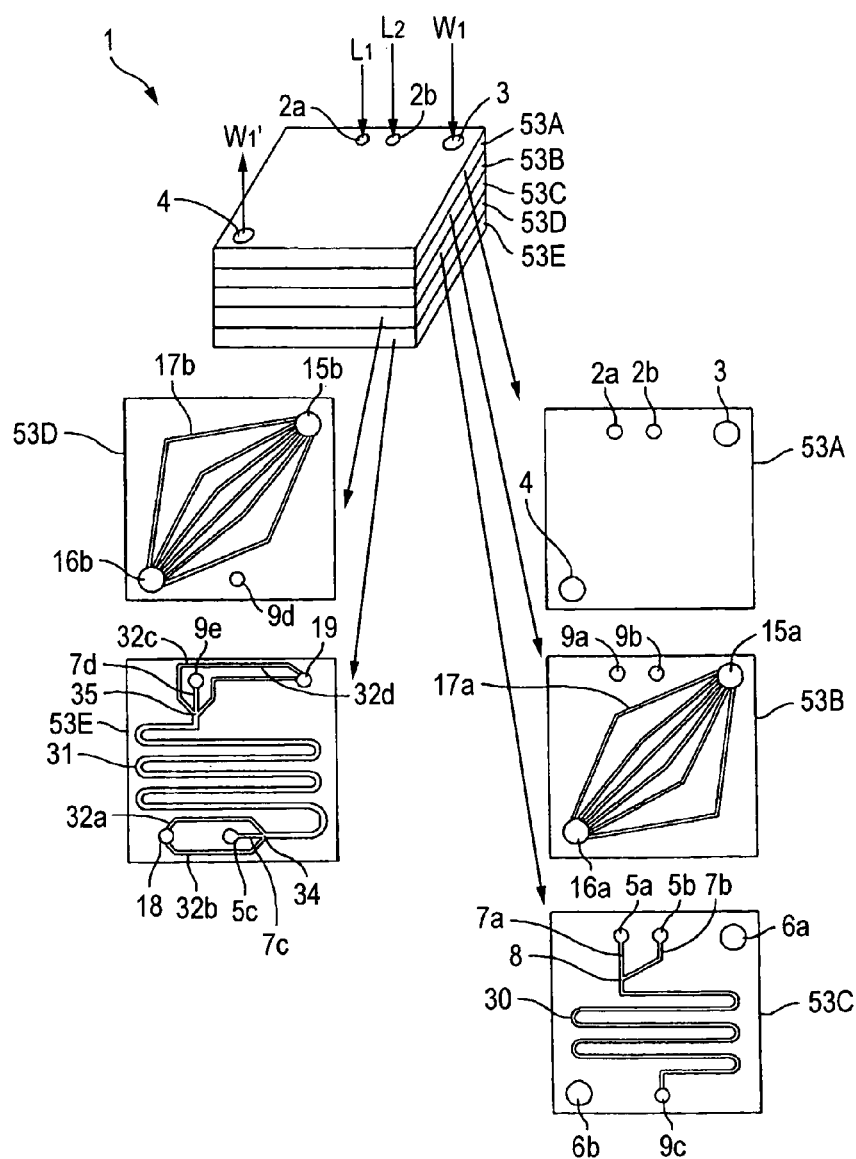
FIG. 10A is a perspective view showing a microreactor according to a fourth embodiment of the invention.
FIG. 10B is a plan view of respective pattern layers in the microreactor.

FIG. 10A is a perspective view showing a microreactor according to a fourth embodiment of the invention. FIG. 10B is a plan view showing respective layers in the microreactor. This microreactor 1 is formed in the same manner as in the first embodiment except that both merging and reaction of source fluids can be performed in one pattern layer. Incidentally, each of pattern layers 53A to 53E constituting the microreactor 1 is formed by a two-stage electroforming method.

The first pattern layer 53A has: first and second inlets 2a and 2b for leading source fluids $L_1$ and $L_2$ in; a constant-temperature water inlet 3 for leading constant-temperature water $W_1$ in; and a constant-temperature water outlet 4 for draining used constant-temperature water $W_1'$.

The second pattern layer 53B defines: through-holes 9a and 9b, a constant-temperature water inlet hole 15a and a constant-temperature water ejection hole 16a defined so as to correspond to the inlets 2a and 2b, the constant-temperature water inlet 3 and the constant-temperature water outlet 4 of the first pattern layer 53A; and a plurality of groove portions 17a for connecting the constant-temperature water inlet hole 15a and the constant-temperature water ejection hole 16a to each other.

The third pattern layer 53C defines: inlet holes 5a and 5b and through-holes 6a and 6b defined so as to correspond to the through-holes 9a and 9b, the constant-temperature water inlet hole 15a and the constant-temperature water ejection hole 16a of the second pattern layer 53B; channels 7a and 7b in which the source fluids $L_1$ and $L_2$ flow laminarly and meet with (merge into) each other at a junction 8; a reaction portion 30 in which the merged source fluids $L_1$ and $L_2$ react with each other while flowing laminarly; and a through-hole 9c through which the reaction liquid M obtained as a product of reaction of the source fluids $L_1$ and $L_2$ is fed to the lower layer.

The fourth pattern layer 53D defines: a through-hole 9d, a constant-temperature water inlet hole 15b and a constant-temperature water ejection hole 16b defined so as to correspond to the through-holes 9c, 6a and 6b of the third pattern layer 53C; and a plurality of groove portions 17b for connecting the constant-temperature water inlet hole 15b and the constant-temperature water ejection hole 16b to each other.

The fifth pattern layer 53E defines: a reaction liquid M inlet hole 5c defined so as to correspond to the through-hole 9d of the fourth pattern layer 53D; a washing water inlet 18 provided as a through-hole for leading washing water such as distilled water in; washing water channels 32a and 32b for pouring the washing water from the washing water inlet 18 to a junction 34; a channel 7c for pouring the reaction liquid M to a washing channel 3l; the washing channel 3l for leading the washing water in from the junction 34 and pouring the washing water as a laminar flow while bringing the washing water into contact with the reaction liquid M from the inlet hole 5c; a through-hole 9e for separating the washed reaction liquid M at a flow-dividing portion 35 and draining the reaction liquid M to the outside of the microreactor 1 through a channel 7d; and a washing water outlet 19 from which waste water after washing is drained to the outside of the microreactor 1 through washing water channels 32c and 32d.

(Operation of the Fourth Embodiment)

Figure 11:
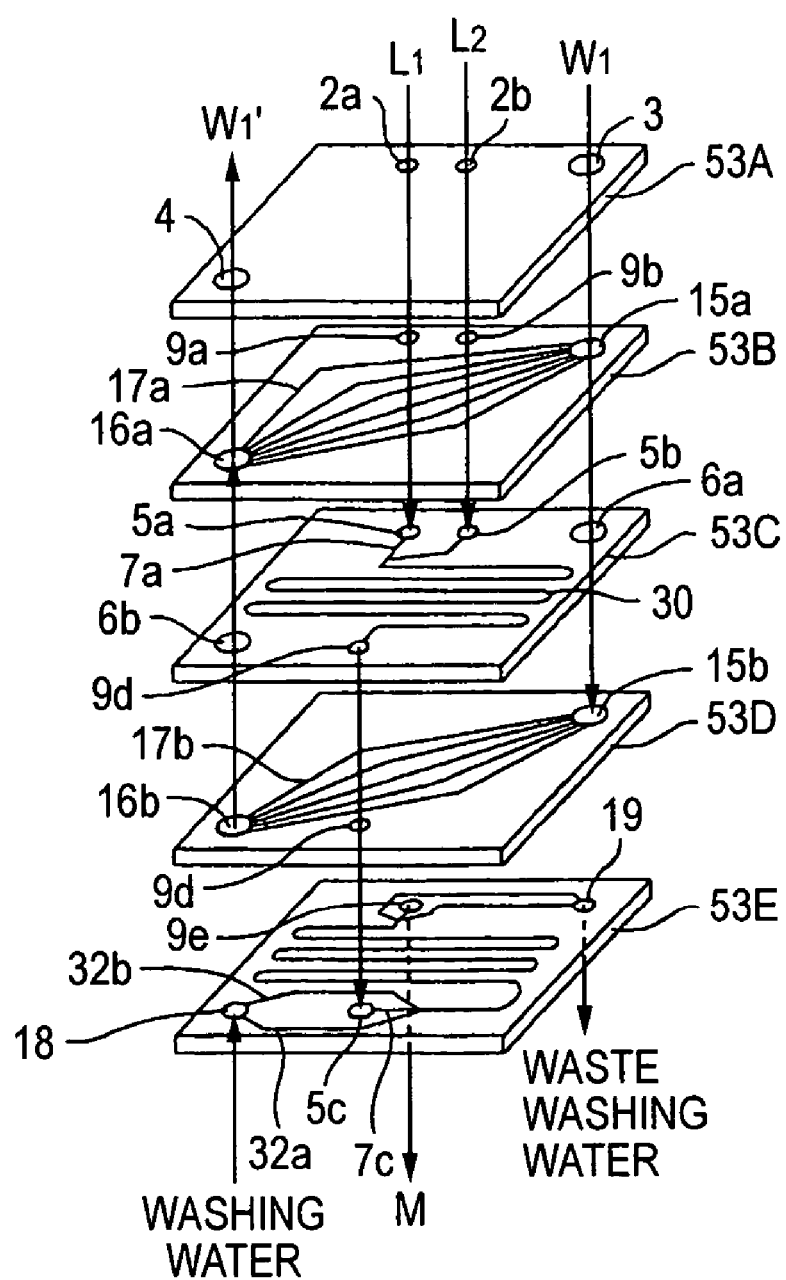
FIG. 11 is an exploded perspective view showing a flow of fluid in the microreactor according to the fourth embodiment of the invention.

Next, the operation of the microreactor 1 according to the fourth embodiment will be described with reference to FIG. 11. FIG. 11 is an exploded perspective view showing a flow of fluid in the microreactor 1.

(Merging and Reaction of the First and Second Source Fluids)

When the first source fluid $L_1$ is led in through the first inlet 2a of the first pattern layer 53A while the second source fluid $L_2$ is led in through the second inlet 2b of the first pattern layer 53A, these source fluids $L_1$ and $L_2$ are led into the inlet holes 5a and 5b of the third pattern layer 53C through the through-holes 9a and 9b of the second pattern layer 53B. The source fluids $L_1$ and $L_2$ led into the inlet holes 5a and 5b flow laminarly in the channels 7a and 7b and meet with (merge into) each other at the junction 8a. The confluent source fluids $L_1$ and $L_2$ flow laminarly in the reaction portion 30 and advance while reacting with each other at liquid interfaces between the source fluids $L_1$ and $L_2$. The reaction liquid M obtained as a product of reaction is drained from the through-hole 9c and led into the inlet hole 5c of the fifth pattern layer 53E via the through-hole 9d of the fourth pattern layer 43D.

(Washing of the Reaction Liquid)

The reaction liquid M led into the inlet hole 5c is washed with washing water led in through the washing water inlet 18 of the fifth pattern layer 53E in the same manner as in the first embodiment. The washed reaction liquid M is drained from the through-hole 9e to the outside of the microreactor 1. On the other hand, waste water after washing is drained from the washing water outlet 19 to the outside of the microreactor 1.

(Temperature Control of the Reaction Portion)

On the other hand, the constant-temperature water $W_1$ led in through the constant-temperature water inlet 3 of the first pattern layer 53A flows in the groove portions 17a and 17b of the second and fourth pattern layers 53B and 53D and is drained from the constant-temperature water outlet 4 of the first pattern layer 53A in the same manner as in the first embodiment. The reaction portion 30 of the third pattern layer 53C sandwiched between the second and fourth pattern layers 53B and 53D is kept at a desired reaction temperature even if there is an exothermic or endothermic change caused by the reaction.

(Effects of the Fourth Embodiment)

According to the fourth embodiment, the following effects can be obtained in addition to the effects of the microreactor 1 according to the first embodiment.

(i) Because both merging and reaction of source fluids can be performed in one pattern layer, reduction in size of the microreactor can be attained.

(ii) Because the reaction temperature can be controlled just after merging, optimization of reaction can be attained to improve the yield of the product of reaction.

Fifth Embodiment

Figure 12A:
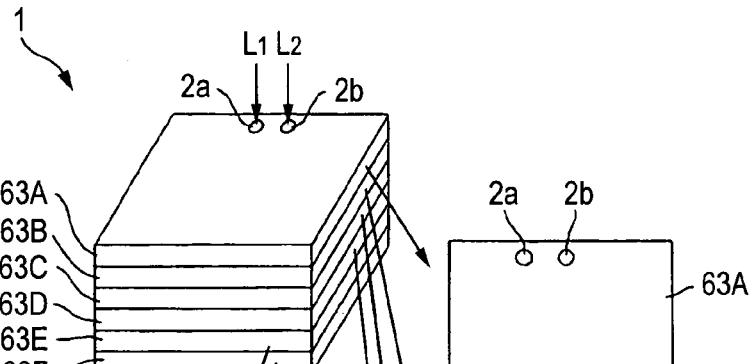
FIG. 12A is a perspective view showing a microreactor according to a fifth embodiment of the invention.
Figure 12B:
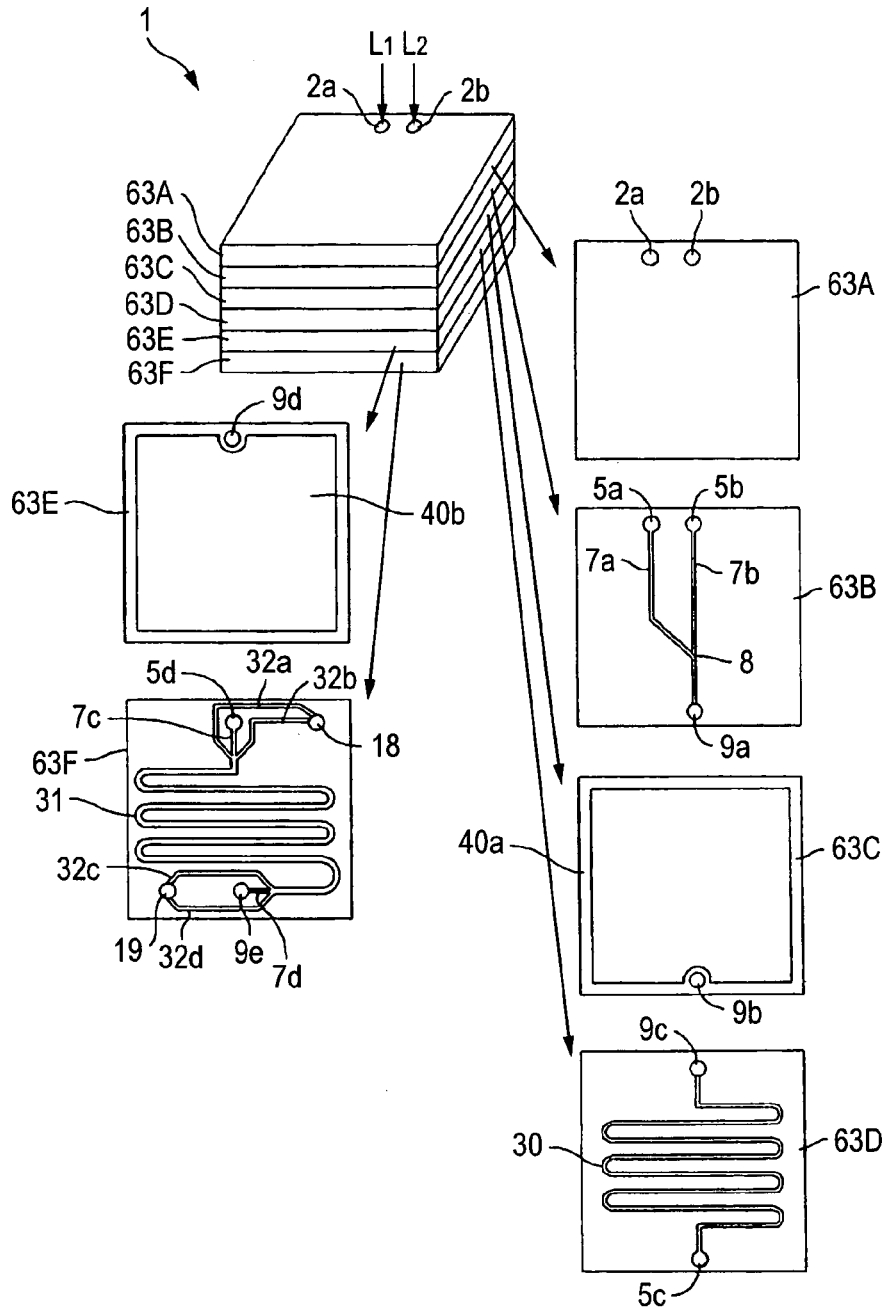
FIG. 12B is a plan view of respective pattern layers in the microreactor.

FIG. 12A is a perspective view showing a microreactor according to a fifth embodiment of the invention. FIG. 12B is a plan view showing respective pattern layers in the microreactor. This microreactor 1 is formed in the same manner as in the first embodiment except that the pattern layers having heat exchange functions are replaced by pattern layers constituting heat-insulating layers. Incidentally, each of pattern layers 63A to 63F constituting the microreactor 1 is formed by a two-stage electroforming method.

The first pattern layer 63A defines first and second inlets 2a and 2b for leading source fluids $L_1$ and $L_2$ in.

The second pattern layer 63B defines: inlet holes 5a and 5b defined so as to correspond to the inlets 2a and 2b of the first pattern layer 63A; channels 7a and 7b in which the source fluids $L_1$ and $L_2$ thus led in flow laminarly and meet with (merge into) each other at a junction 8; and a through-hole 9a through which the merged source fluids $L_1$ and $L_2$ are fed to the lower layer.

The third pattern layer 63C defines: a through-hole 9b defined so as to correspond to the through-hole 9a of the second pattern layer 63B; and a recess 40a for forming a heat-insulating layer when the second pattern layer 63B is laminated on the third pattern layer 63C.

The fourth pattern layer 63D defines: a inlet hole 5c defined so as to correspond to the through-hole 9b of the third pattern layer 63C; a reaction portion 30 in which the source fluids $L_1$ and $L_2$ led in react with each other while flowing laminarly; and a through-hole 9c through which the reaction liquid M obtained as a product of reaction of the source fluids $L_1$ and $L_2$ is fed to the lower layer.

The fifth pattern layer 63E defines: a though-hole 9d defined so as to correspond to the through-hole 9c of the fourth pattern layer 63D; and a recess 40b for forming a heat-insulating layer when the fifth pattern layer 63E is laminated on the fourth pattern layer 63D.

The sixth pattern layer 63F defines: a reaction liquid M inlet hole 5d defined so as to correspond to the through-hole 9d of the fifth pattern layer 63E; a washing water inlet 18 provided as a through-hole for leading washing water such as distilled water in; washing water channels 32a and 32b for pouring the washing water from the washing water inlet 18 to a junction 34; a channel 7c for pouring the reaction liquid M from the inlet hole 5d to a washing channel 3l; the washing channel 3l for leading the washing water in from the junction 34 and pouring the washing water as a laminar flow while bringing the washing water into contact with the reaction liquid M; a through-hole 9e for separating the washed reaction liquid M at a flow-dividing portion 35 and draining the reaction liquid M to the outside of the microreactor 1 through a channel 7d; and a washing water outlet 19 from which waste water after washing is drained to the outside of the microreactor 1 through washing water channels 32c and 32d.

On this occasion, the fourth pattern layer 63D having the reaction portion 30 is sandwiched between the third and fifth pattern layer 63C and 63E having the recesses 40a and 40b so that the fourth pattern layer 63D is thermally insulated by the laminated recesses 40a and 40b.

(Operation of the Fifth Embodiment)

Figure 13:
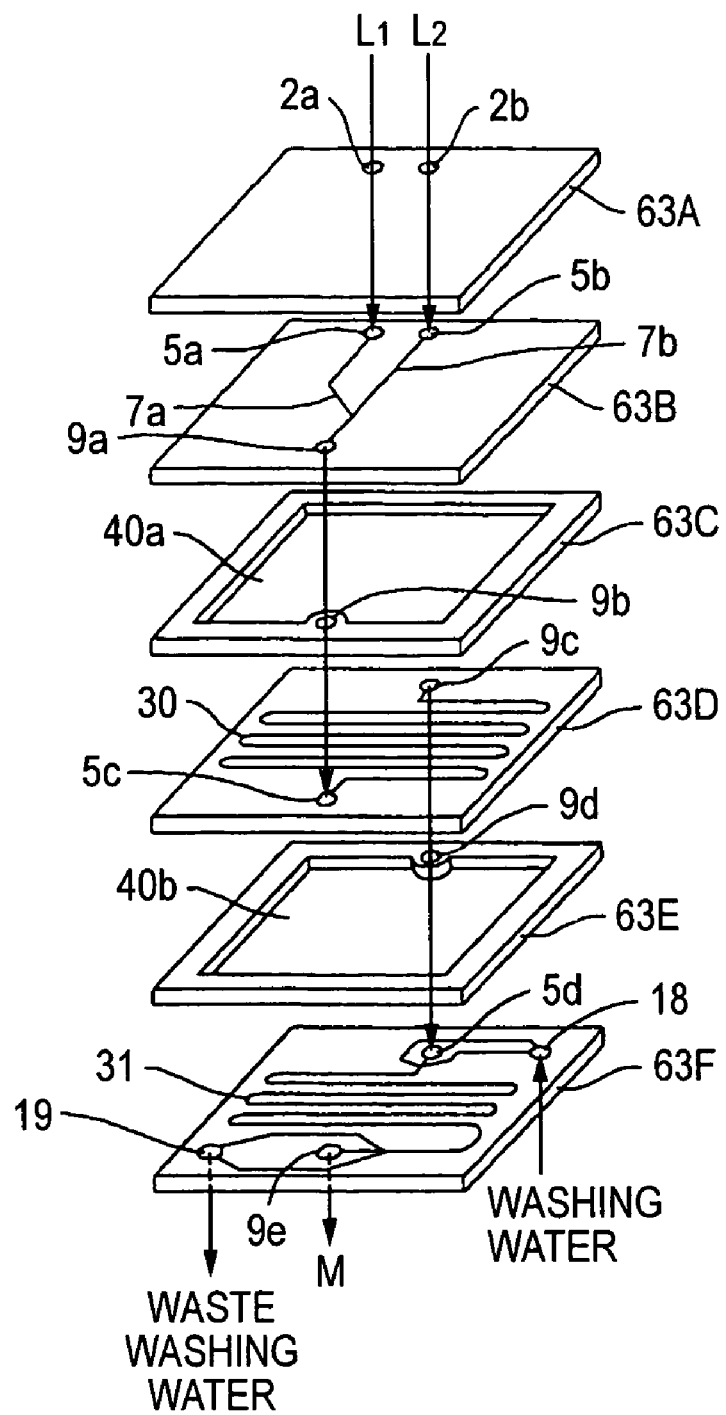
FIG. 13 is an exploded perspective view showing a flow of fluid in the microreactor according to the fifth embodiment of the invention.

Next, the operation of the microreactor 1 according to the fifth embodiment will be described with reference to FIG. 13. FIG. 13 is an exploded perspective view showing a flow of fluid in the microreactor 1.

(Merging and Reaction of the First and Second Source Fluids)

When the first source fluid $L_1$ is led in through the first inlet 2a of the first pattern layer 63A while the second source fluid $L_2$ is led in through the second inlet 2b of the first pattern layer 63A, these source fluids $L_1$ and $L_2$ flow laminarly in the channels 7a and 7b through the inlet holes 5a and 5b of the second pattern layer 63B and meet with (merge into) each other at the junction 8. The merged source fluids $L_1$ and $L_2$ are led into the inlet hole 5c of the fourth pattern layer 63D via the through-hole 9a of the second pattern layer 63B and the through-hole 9b of the third pattern layer 63C. The source fluids $L_1$ and $L_2$ led into the inlet hole 5c flow laminarly in the reaction portion 30 and advance while reacting with each other at liquid interfaces between the source fluids $L_1$ and $L_2$. The reaction liquid M obtained as a product of reaction is led into the inlet hole 5d of the sixth pattern layer 63F via the through-hole 9d of the fifth pattern layer 63E from the through-hole 9c of the fourth pattern layer 63D.

(Washing of the Reaction Liquid)

The reaction liquid M led into the inlet hole 5d is washed with washing water led in through the washing water inlet 18 of the sixth pattern layer 63F in the same manner as in the first embodiment. The washed reaction liquid M is drained from the through-hole 9e to the outside of the microreactor 1. On the other hand, waste water after washing is drained from the washing water outlet 19 to the outside of the microreactor 1.

(Temperature Control of the Reaction Portion)

Heat conduction from the reaction portion 30 is shielded by the third and fifth pattern layers 63C and 63E having the recesses 40a and 40b which are kept vacuum and which are located on opposite sides of the fourth pattern layer 63D having the reaction portion 30, so that the temperature of the reaction portion 30 is controlled.

(Effect of the Fifth Embodiment)

According to the fifth embodiment, the temperature of the reaction portion 30 can be controlled by the heat-insulating layers without use of any fluid such as constant-temperature water.

Sixth Embodiment

Figure 14:
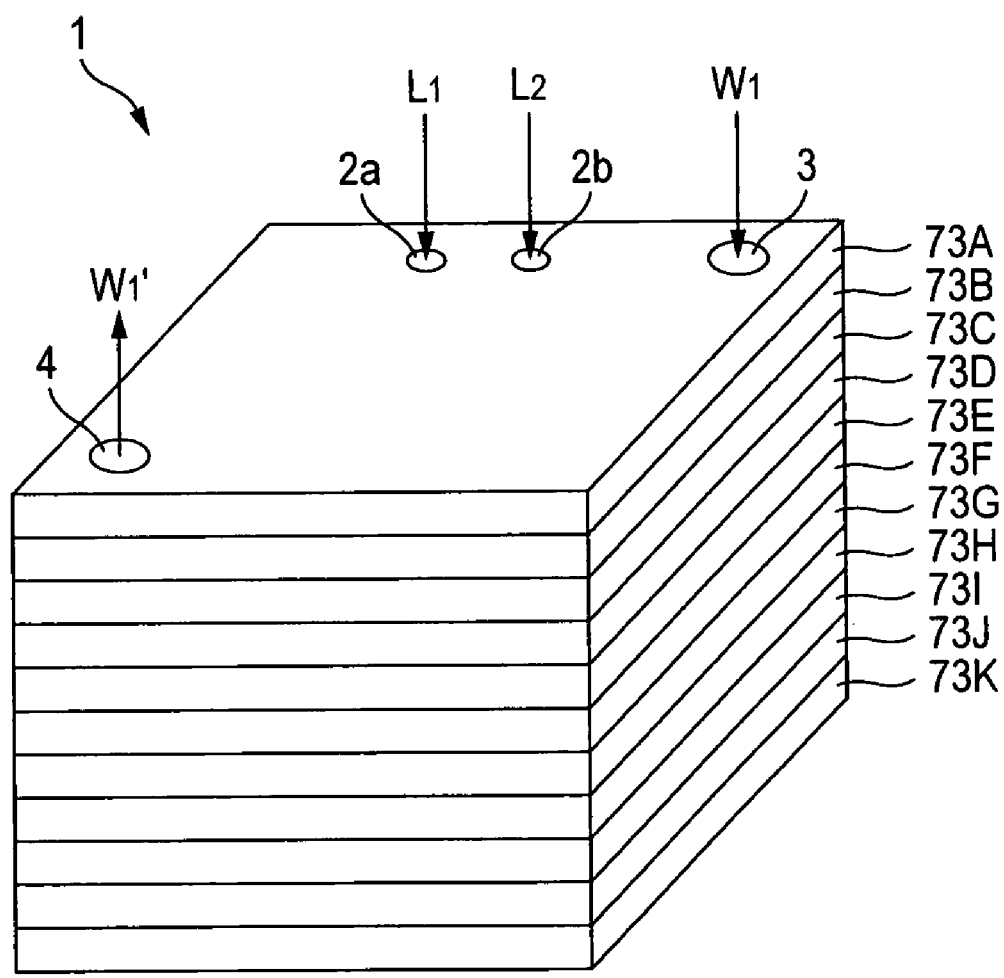
FIG. 14 is a perspective view of a microreactor according to a sixth embodiment of the invention.

FIG. 14 is a perspective view of a microreactor according to a sixth embodiment. FIGS. 15A and 15B are exploded perspective views of the microreactor. FIG. 15A shows pattern layers having respective functions. FIG. 15B shows pattern layers laminated between the pattern layers having the respective functions.

The microreactor 1 has the same structure as in the first embodiment and is composed of eleven pattern layers 73A to 73K, that is, first to eleventh pattern layers each formed by a one-stage electroforming method. That is, there are provided the first, second, fourth, sixth, eighth and tenth pattern layers 73A, 73B, 73D, 73F, 73H and 73J formed in the same manner as the first to sixth pattern layers 13A to 13F in the first embodiment and the third, fifth, seventh, ninth and eleventh pattern layers 73C, 73E, 73G, 73I and 73K disposed under the second, fourth, sixth, eighth and tenth pattern layers 73B, 73D, 73F, 73H and 73J respectively.

Figure 16A:
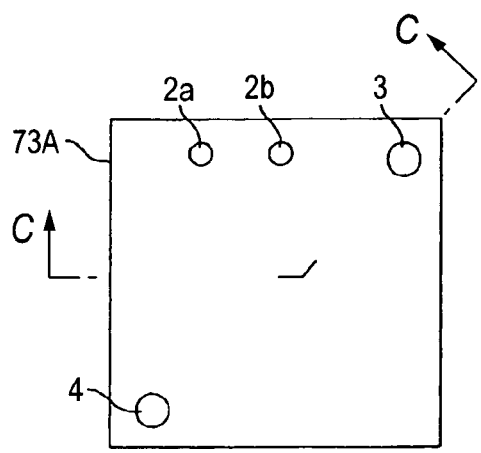
FIGS. 16A to 16F show pattern layers according to the sixth embodiment of the invention, FIG. 16A being a plan view of the first pattern layer, FIG. 16B being a sectional view taken along the line A-A in FIG. 16A, FIG. 16C being a plan view of the second pattern layer, FIG. 16D being a sectional view taken along the line D-D in FIG. 16C, FIGS. 16E and 16F being sectional views showing a method for producing a donor substrate by a one-stage electroforming method.
Figure 16B:
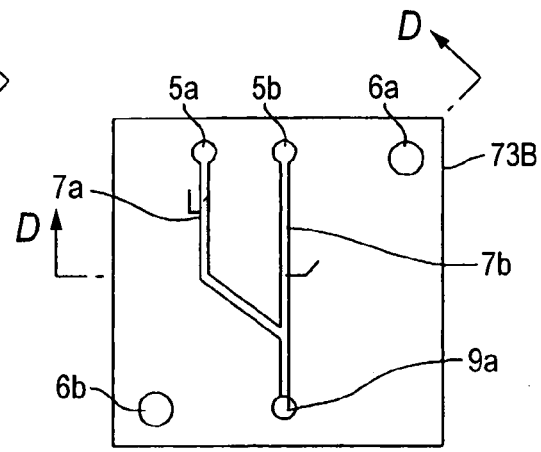
Figure 16C:
Figure 16D:
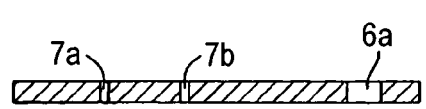
Figure 16E:
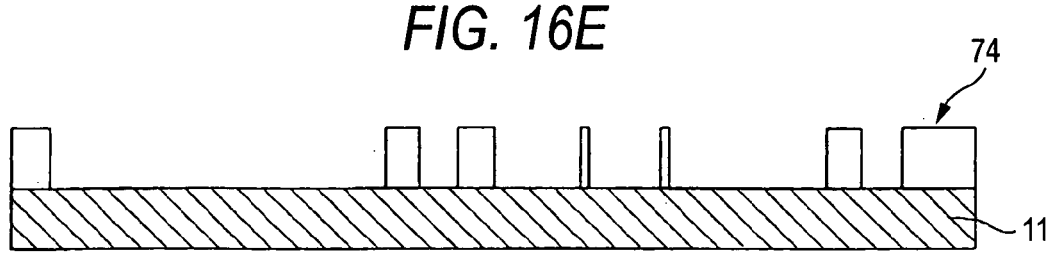
Figure 16F:
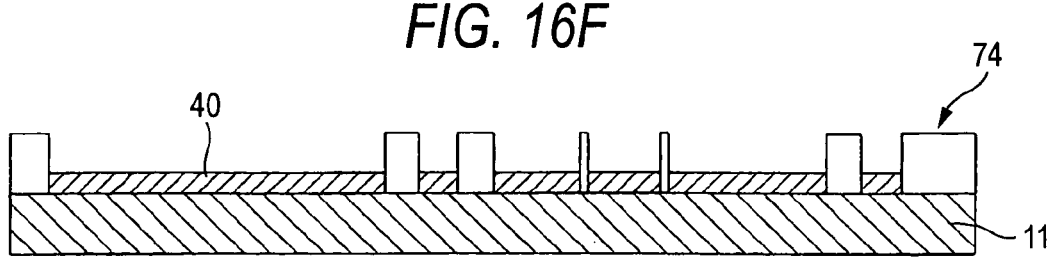
Figure 17:
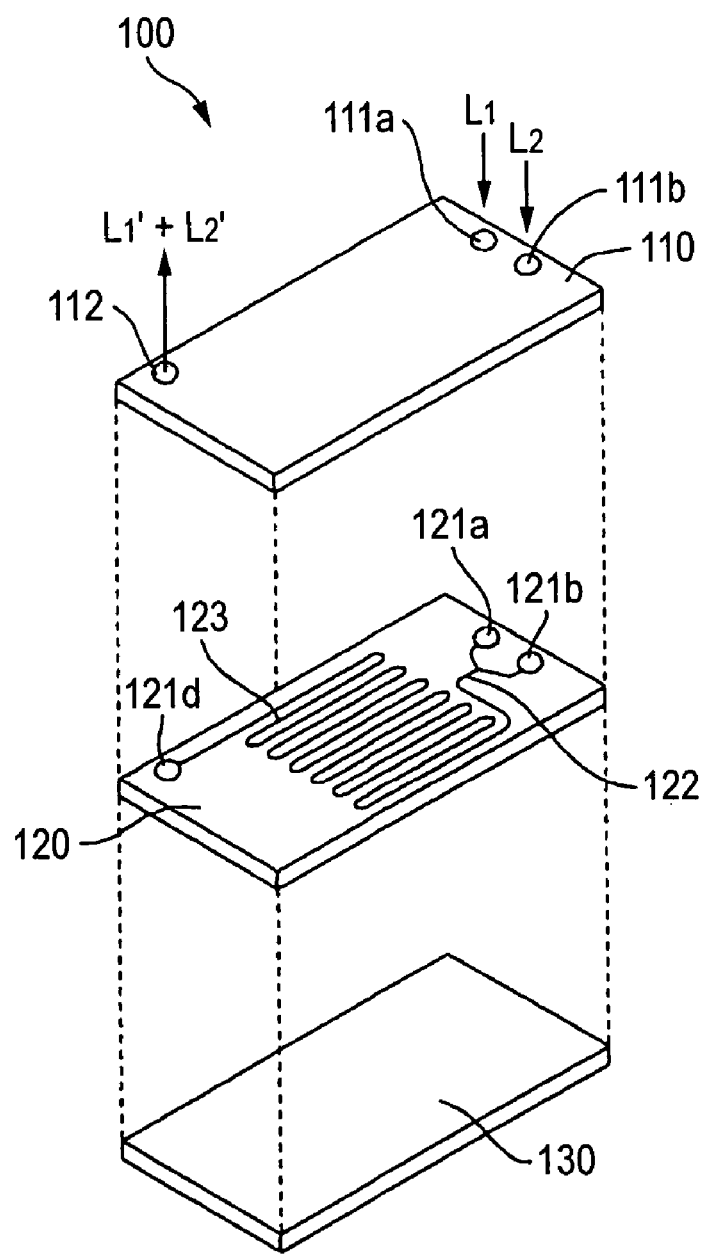
FIG. 17 is an exploded perspective view of a microreactor according to the background art.

FIGS. 16A to 16F show the first and second pattern layers 73A and 73B for explaining the one-stage electroforming method. FIG. 16A is a plan view of the first pattern layer 73A. FIG. 16B is a sectional view taken along the line C-C in FIG. 16A. FIG. 16C is a plan view of the second pattern layer 73B. FIG. 16D is a sectional view taken along the line D-D in FIG. 16C. FIGS. 16E and 16F are sectional views showing a process of producing a donor substrate. The first and second pattern layers 73A and 73B are pierced by the one-stage electroforming method as described above so that the first and second inlets 2a and 2b, the constant-temperature water inlet 3, the constant-temperature water outlet 4, the inlet holes 5a and 5b, the through-holes 6a, 6b and 9a and the channels 7a and 7b are formed.

Next, the newly added third, fifth, seventh, ninth and eleventh pattern layers 73C, 73E, 73G, 73I and 73K will be described.

The third pattern layer 73C defines through-holes 6d, 6e and 9f defined so as to correspond to the through-holes 6a, 6b and 9a of the second pattern layer 73B.

The fifth pattern layer 73E defines through-holes 6f, 6g and 9g defined so as to correspond to the constant-temperature water inlet hole 15a, the constant-temperature water ejection hole 16a and the through-hole 9b of the fourth pattern layer 73D.

The seventh pattern layer 73G defines through-holes 6h, 6i and 9h defined so as to correspond to the through-holes 6c, 6d and 9c of the sixth pattern layer 73F.

The ninth pattern layer 73I defines a through-hole 9i defined so as to correspond to the through-hole 9d of the eighth pattern layer 73H.

The eleventh pattern layer 73K defines through-holes 9k, 37a and 37b defined so as to correspond to the through-hole 9e, the washing water inlet 18 and the washing water outlet 19 of the tenth pattern layer 73I.

(Production Method according to the Sixth Embodiment)

Next, a method for producing the microreactor 1 according to the sixth embodiment will be described with reference to FIG. 14, FIGS. 15A and 15B and FIGS. 16A to 16F. First, a substrate 11 of a metal is prepared. A thick-film photo resist is applied on the substrate 11 and exposed to light with use of a photomask corresponding to the respective patterns 73A to 73K of the microreactor 1 to be produced. The photo resist is developed to form a resist pattern 74 which is reversal of the respective pattern layers 73A to 73K.

Then, the substrate 11 having the resist pattern 74 deposited thereon is immersed in a plating bath so that nickel plating is grown on a surface of the substrate 11 not covered with the resist pattern. Then, the resist pattern 74 is removed to produce a donor substrate 10 having the respective pattern layers 73A to 73K which are formed by batch processing and which constitute the microreactor 1.

Then, the donor substrate 10 is set in the bonding apparatus 20 shown in FIGS. 4A to 4C. The respective pattern layers are bonded to the target substrate 27 successively as described in the first embodiment. Thus, the microreactor 1 is produced.

(Effects of the Sixth Embodiment)

According to the sixth embodiment, the following effects can be obtained in addition to the effects of the microreactor 1 according to the first embodiment.

(i) Because it is unnecessary to strictly control a process such as stopping etching at an etching depth corresponding to the middle of the depth of each pattern layer, it is easy to produce the pattern layer.

(ii) Because pattern layers as top and bottom surfaces of pattern layers having respective functions are interposed between the pattern layers having the respective functions, it is easy to produce the pattern layers though the number of pattern layers increases. Accordingly, the microreactor can be produced easily. Incidentally, the two kinds of pattern layers may be used wisely in accordance with necessity so that reduction in cost can be attained.

Example 1

Example 1 of the invention will be described below. Example 1 corresponds to the first embodiment. A polymethacrylate particle emulsion is a subject of the reaction liquid.

A mixture of 10 g of methacrylic acid and 0.1 g of divinylbenzene as monomers is used as the first source fluid. The first source fluid is led in through the first inlet 2a shown in FIGS. 1A and 1B at a flow rate of 0.1 ml/min. A solution prepared by dissolving 0.5 g of a surface-active agent EMULGEN MS-110 (made by KAO CORPORATION) and 0.01 g of ammonium persulfate in 120 ml of distilled water is used as the second source fluid. The second source fluid is led in through the second inlet 2b at a flow rate of 0.1 ml/min. The two source fluids thus led in flow laminarly in the channels 7a and 7b and meet with (merge into) each other at the junction 8. Then, the confluent source fluids are led into the inlet hole 5c via the through-hole 9b from the through-hole 9a. The two source fluids led into the inlet hole 5c react with each other in the reaction portion 30. Thus, a polymethacrylate particle emulsion is produced as the reaction liquid. The reaction liquid is led into the inlet hole 5d of the sixth pattern layer 13F via the through-hole 9d from the through-hole 9c.

On the other hand, cooling water kept at a controlled temperature of 20° C. is led in through the constant-temperature water inlet 3. The cooling water is led into the third and fifth pattern layers 13C and 13E, so that the reaction portion 30 of the fourth pattern layer 13D is kept at 20° C.

In the sixth pattern layer 13F, the reaction liquid is led into the washing channel 31 while distilled water is led in from the washing water inlet 18 through the channels 32a and 32b at a flow rate of 0.1 ml/min at the junction 34. At the junction of the reaction liquid and the distilled water, a laminar flow is generated so that two flows of distilled water flow on opposite sides of the reaction liquid. Accordingly, the polymethacrylate particle emulsion as a product of reaction continuously flows in the center of the laminar flow but unnecessary solvent components diffuse into the two flows of distilled water on the both sides of the channel.

At the flow-dividing portion 35, the reaction liquid is separated from the washing water. Thus, the washed polymethacrylate particle emulsion is obtained from the center of the channel.

Incidentally, the same emulsion can be produced when methacrylic acid is replaced by acrylic acid, methacrylic alkyl ester, acrylic alkyl ester, styrene, methacrylic acid amide, acrylic acid amide, methacrylic alkyl amide, or acrylic alkyl amide.

Any pigment may be dispersed in the aforementioned monomers. The pigment is not particularly limited but carbon black or phthalocyanine pigment can be used as the pigment.

Example 2

Example 2 of the invention will be described below. Example 2 corresponds to the sixth embodiment. A method for producing the donor substrate 10 by a one-stage electroforming method will be described.

(Method for Producing the Donor Substrate)

Next, a method for producing the microreactor 1 will be described with reference to FIGS. 4A to 4C and FIG. 14. First, a substrate 11 of mirror-polished stainless steel is prepared. A photo resist film about 30 μm thick is applied on the substrate 11 and exposed to light with use of a photomask corresponding to the respective pattern layers of the microreactor 1 to be produced. The photo resist is developed to form a resist pattern which is reversal of the respective pattern layers. The size of each pattern layer is generally from the order of millimeter square to the order of centimeter square. The pattern layers are arranged in the form of a matrix at regular intervals of from the order of hundreds of microns to the order of millimeter. Incidentally, the film thickness of the photo resist may be selected arbitrarily if the film thickness of the photo resist is not smaller than the film thickness of plating formed in the next process.

Then, the substrate 11 having the resist pattern deposited thereon is immersed in a plating bath so that nickel plating 25 μm thick is grown on a surface of the substrate 11 not covered with the photo resist. The film thickness of plating is decided in accordance with the design of the microreactor to be produced but the film thickness of plating is generally from the order of microns to the order of hundreds of microns, preferably from 10 μm to 50 μm. Then, the resist pattern is removed. Thus, the donor substrate 10 is produced in such a manner that the respective pattern layers constituting the microreactor are formed by batch processing.

Other Embodiments

The invention is not limited to the aforementioned embodiments and various changes may be made without departing from the gist of the invention. For example, constituent members in the respective embodiments may be combined at option without departing from the gist of the invention.

Although all the embodiments except the fifth embodiment have been described on the case where constant-temperature water is used for controlling the reaction temperature, the constant-temperature water may be replaced by a suitable material such as gas or oil in accordance with the subject of temperature control. Although description has been made on the case where two heat exchange portions are provided on opposite sides of a pattern layer having a reaction portion, one heat exchange portion may be disposed on a single side of the pattern layer.

Although description has been made on the case where nickel is used as a plating material when the donor substrate 10 is produced, copper or gold capable of being formed by plating may be used like nickel. Because nickel is excellent in chemical resistance and heat resistance, nickel is suitable to a microreactor used for synthesis caused by acid or alkali reaction or high-temperature reaction. Because copper has a very high heat conductivity, copper is suitable to a microreactor used for synthesis severe in terms of temperature control.

For production of each pattern layer, the groove portions 17, the inlet holes 5, etc. may be formed by cutting without etching of the plating layer.

A releasable layer may be provided between the substrate and the pattern layer so that the pattern layer can be removed easily.

What is claimed is:

1. A microfluidic device comprising:
   a processing layer that applies a predetermined process to a plurality of subject fluids, the processing layer comprising a reaction portion that makes at least two of the plurality of subject fluids react with each other;
   a plurality of temperature control layers, two or more of the temperature control layers being in fluid communication with each other and being configured to maintain a predetermined temperature environment in the processing layer by circulating a fluid at a predetermined temperature, and one or more of the temperature control layers comprising a closed space that shields heat conduction from the processing layer and is a vacuum; and
   a washing layer comprising a washing channel in fluid communication with at least one washing fluid channel and a flow-dividing portion, the washing fluid channel being configured to provide washing fluid to the washing channel, the washing channel being configured to have a reaction fluid flow in a center portion of the washing channel sandwiched between layers of the washing fluid, and the flow-dividing portion being configured to separate the reaction fluid from the washing fluid;

wherein the reaction portion of the processing layer is adjacent to and sandwiched between at least two of the plurality of temperature control layers.

2. The microfluidic device according to claim 1, wherein the processing layer performs as the predetermined process one process selected from the group consisting of making the subject fluid a laminar flow, dividing flow of the subject fluid, merging the subject fluid and another fluid to flow together, mixing the subject fluid and another fluid, making the subject fluid react, synthesizing another material from the subject fluid, diluting the subject fluid, washing the subject fluid and concentrating the subject fluid.

3. The microfluidic device according to claim 1, wherein the temperature control layers in fluid communication with each other perform heat exchange and the temperature control layers that comprise the closed space perform heat insulation.

4. The microfluidic device according to claim 1, wherein each of the processing layer and the temperature control layers are made of a metal plate.

5. The micro fluidic device according to claim 1, wherein the processing layer and the temperature control layers are laminated by room-temperature bonding.

6. The microfluidic device according to claim 1, wherein each of the processing layer and the temperature control layers are formed by electroforming.

7. The microfluidic device according to claim 1, wherein each of the processing layer and the temperature control layers are formed by a semiconductor patterning process.

8. The microfluidic device according to claim 1, wherein the temperature control layers in fluid communication with each other comprise a channel in which a heat exchange medium kept at a predetermined temperature the liquid flows so that heat exchange is performed between the heat exchange medium liquid and the processing layer.

9. The microfluidic device according to claim 1, wherein:
the processing layer is provided as a plurality of processing layers in which respective predetermined processes are performed at different temperatures.

10. The microfluidic device according to claim 1, wherein the processing layer comprises:
a reaction layer that merges a plurality of subject fluids to flow together to react the subject fluids.

11. A microfluidic device comprising:
a first processing layer that applies a predetermined process to a plurality of subject fluids, the first processing layer comprising a reaction portion that makes at least two of the plurality of subject fluids react with each other;
a second processing layer in which a reaction fluid obtained as a product of reaction of the subject fluids is washed, the second processing layer comprising a washing channel in fluid communication with at least one washing fluid channel and a flow-dividing portion, the washing fluid channel being configured to provide washing fluid to the washing channel, the washing channel being configured to have a reaction fluid flow in a center portion of the washing channel sandwiched between layers of the washing fluid, and the flow-dividing portion being configured to separate the reaction fluid from the washing fluid; and
a plurality of temperature control layers, two or more of the temperature control layers being in fluid communication with each other and being configured to maintain a predetermined temperature environment in the first processing layer by circulating a fluid flowing at a predetermined temperature, and one or more of the temperature control layers comprising a closed space that shields heat conduction from the processing layer and is a vacuum;
wherein the reaction portion of the first processing layer is adjacent to and sandwiched between at least two of the plurality of temperature control layers.

12. The microfluidic device according to claim 11, wherein the temperature control layers in fluid communication with each other comprise a channel in which the liquid flows so that heat exchange is performed between the liquid and the first processing layer.

13. A microfluidic device comprising:
a first processing layer that applies a predetermined process to a plurality of subject fluids, the first processing layer comprising a first reaction portion that makes at least two of the plurality of subject fluids react with each other;
a second processing layer that applies a predetermined process to the product from the first reaction portion, the second processing layer comprising a second reaction portion that makes the product from the first reaction portion react with another subject fluid;
a third processing layer in which a reaction fluid obtained as a product of the second reaction is washed, the third processing layer comprising a washing channel in fluid communication with at least one washing fluid channel and a flow-dividing portion, the washing fluid channel being configured to provide washing fluid to the washing channel, the washing channel being configured to have a reaction fluid flow in a center portion of the washing channel sandwiched between layers of the washing fluid, and the flow-dividing portion being configured to separate the reaction fluid from the washing fluid; and
a plurality of temperature control layers, two or more of the temperature control layers in fluid communication with each other and being configured to maintain a predetermined temperature environment in the first processing layer by circulating a fluid at a predetermined temperature, and one or more of the temperature control layers comprising a closed space that shields heat conduction from the processing layer and is a vacuum;
wherein the reaction portion of the first processing layer is adjacent to and sandwiched between at least two of the plurality of temperature control layers in fluid communication with each other; and
wherein the reaction portion of the second processing layer is adjacent to and sandwiched between at least two of the plurality of temperature control layers in fluid communication with each other.

14. The microfluidic device according to claim 13, wherein:
the temperature control layers in fluid communication with each other comprise a channel in which the liquid flows so that heat exchange is performed between the liquid and the respective processing layer.

* * * * *